(12) United States Patent
Chatterjee

(10) Patent No.: US 8,386,620 B2
(45) Date of Patent: Feb. 26, 2013

(54) AD HOC NETWORKING BASED ON CONTENT AND LOCATION

(75) Inventor: Shuvo Chatterjee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 12/638,908

(22) Filed: Dec. 15, 2009

(65) Prior Publication Data

US 2011/0142016 A1 Jun. 16, 2011

(51) Int. Cl.
*G06F 13/00* (2006.01)
(52) U.S. Cl. .................. 709/228; 709/224; 719/318
(58) Field of Classification Search .......... 709/217, 709/219, 223, 224, 227, 228, 230, 237; 719/318
See application file for complete search history.

(56) References Cited

U.S. PATENT DOCUMENTS

| | | | |
|---|---|---|---|
| 8,010,131 B2 * | 8/2011 | Rothschild | 455/456.3 |
| 8,060,573 B2 * | 11/2011 | Leonard | 709/206 |
| 2005/0181803 A1 | 8/2005 | Weaver et al. | |
| 2006/0085419 A1 | 4/2006 | Rosen et al. | |
| 2006/0166740 A1 | 7/2006 | Sufuentes | |
| 2008/0117201 A1 | 5/2008 | Martinez et al. | |
| 2008/0154697 A1 | 6/2008 | Guday et al. | |
| 2008/0188261 A1 * | 8/2008 | Arnone | 455/550.1 |
| 2008/0291022 A1 | 11/2008 | Amador et al. | |
| 2009/0082038 A1 * | 3/2009 | McKiou et al. | 455/456.6 |
| 2009/0132652 A1 | 5/2009 | Athale et al. | |
| 2009/0234876 A1 | 9/2009 | Schigel et al. | |

FOREIGN PATENT DOCUMENTS

| | | |
|---|---|---|
| WO | 2009070138 | 6/2009 |
| WO | 2009089308 | 7/2009 |
| WO | 2009/101629 | 8/2009 |

OTHER PUBLICATIONS

Notification of Transmittal of the International Search Report and Written Opinion of the International Searching Authority, PCT/US2010/058944, dated May 27, 2011, 12 Pages.

* cited by examiner

*Primary Examiner* — Viet Vu
(74) *Attorney, Agent, or Firm* — Wong, Cabello, Lutsch, Rutherford & Brucculeri, LLP

(57) ABSTRACT

Methods, program products, and systems for ad hoc networking based on content and location are described. A user of a mobile device can identify another user using another mobile device who is close by, if both users have requested to participate in networking. Common interests and experiences of two or more users located close to each other can be identified from content, including automatically created usage data of the mobile devices. Usage data of a mobile device can be created based on activities performed on the mobile device (e.g., songs downloaded), a trajectory of the mobile device (e.g., places traveled), or other public data available from the mobile device (e.g., pictures shared). Each of the users can be notified that another user having the common interests and experiences is close by. A means of initiating communication can be provided to the users to facilitate communication between the users.

62 Claims, 13 Drawing Sheets

AD HOC NETWORKING BASED ON CONTENT AND LOCATION

TECHNICAL FIELD

This disclosure relates generally to social networking.

BACKGROUND

Social networks are a well known phenomenon, and various electronic systems to support social networking are known. Growing a social network can mean that a person needs to discover like-minded or compatible people who have similar interests or experiences to him or her. Identifying like-minded people, however, often requires a substantial amount of and time and effort because identifying new persons with common interests for friendships is difficult. For example, when two strangers meet, it may take a long and awkward conversation to discover their common interests or experiences.

Today, various social networking technologies exist to aid the process of connecting people. A typical modern computer-implemented social networking application requires each user to provide some biographical information, and/or identify his or her interests, and in some instances can suggest to the user other users with compatible interests. For example, some web sites such as LinkedIn.com or Facebook.com require participants to register as members. Each member can fill out a profile or provide other personal data such as professional interests, career information, interests in music, books, movies, and even information about political or religious beliefs. Matching algorithms can then use the profile or data provided to match members with members who are deemed compatible by the algorithms, under the assumption, for example, that matching people's interests and values can lead to successful new friendships or relationships within the social network. Some mobile device-based applications for identifying common interests require each user to configure the user's mobile device, including entering the user's interest, such as the things the user wishes to buy or sell, the kind of people the user wishes to meet, etc., before a social networking opportunity can be found for the user.

SUMMARY

Methods, program products, and systems for ad hoc networking based on content and location are described. A user of a mobile device can identify another user using another mobile device who is close by, if both users have agreed to participate in ad hoc networking based on content and location. Users can be matched based on the users' common interests and experiences. Common interests and experiences of two or more users located close to each other can be identified from content, including automatically created usage data of the mobile devices. Usage data of a mobile device can be created based on activities performed on the mobile device (e.g., songs downloaded), a trajectory of the mobile device (e.g., places traveled), or other public data available from the mobile device (e.g., pictures shared). Each of the users can be notified that another user having the common interests and experiences is close by. A secure means of initiating communication can be provided to the users to facilitate communication between the users.

Techniques for ad hoc networking based on content and location can be implemented to achieve the following exemplary advantages. Two strangers located closed to each other, both having requested to participate in the ad hoc networking based on content and location, can start a conversation from common interests or experiences identified by the ad hoc networking based on content and location. The identified common interests or experiences can be based on actions a user actually performed, rather that what the user says he or she did or liked. People often desire to meet other people for a variety of reasons (e.g., job-seeking, friendship, dating, business, casual conversation, or political debate). Ad hoc networking based on content and location can serve these needs by identifying commonalities between people, without being limited by specialized algorithms (e.g., algorithms tailored for friendship, business relationships, or dating).

Some other advantages of ad hoc networking based on content and location include the ability to facilitate spontaneous user action. A user at any venue (e.g., in a conference, at a beach, in a bar, on an airplane, etc.) can discover another person near the user, where the other person shares similar experience as the user, if the other person also participates in the ad hoc networking. Ad hoc networking techniques based on content and location can provide "icebreakers" that can encourage spontaneous conversation. The users are not required to pre-define a set of match criteria or to set up meetings based on predefined constraints.

The details of one or more implementations of ad hoc networking based on content and location are set forth in the accompanying drawings and the description below. Other features, aspects, and advantages of ad hoc networking based on content and location will become apparent from the description, the drawings, and the claims.

BRIEF DESCRIPTION OF THE DRAWINGS

Like reference symbols in the various drawings indicate like elements.

DETAILED DESCRIPTION

Overview of Ad Hoc Networking Based on Content and Location

Figure 1:
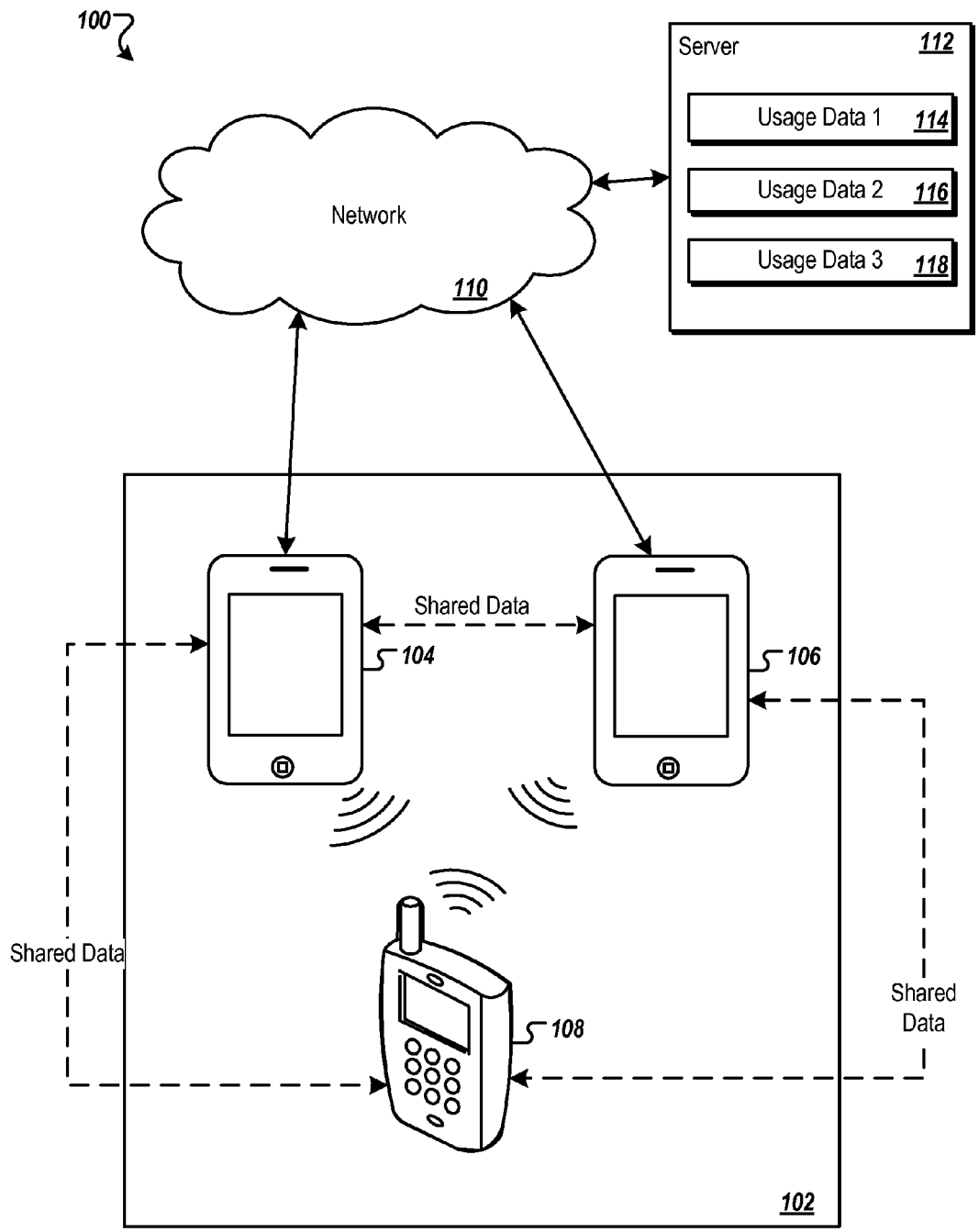
FIG. 1 illustrates an exemplary system for ad hoc networking based on content and location.

FIG. 1 illustrates an exemplary system 100 for ad hoc networking based on content and location. For illustrative purposes, a "Buddy Finder" feature that is backed by ad hoc networking technology based on content and location will be described. The "Buddy Finder" feature can have a user interface for display on a mobile device.

In example system 100, mobile devices 104, 106, and 108 belong to users Adam, Baker, and Carol, respectively. In some implementations, mobile devices 104, 106, and 108 are location-aware mobile devices (e.g., includes GPS). Mobile devices 104, 106, and 108 can include handheld computers, personal digital assistants, cellular telephones, network appliances, cameras, smart phones, electronic tablets, enhanced general packet radio service (EGPRS) mobile phones, network base stations, media players, navigation devices, email devices, game consoles, or a combination of any two or more of these data processing devices or other data processing devices. Adam, Baker, and Carol, strangers to one another, bring mobile devices 104, 106, and 108 to a common venue 102 (e.g., a bar, a town hall meeting, or a sport event). Adam, Baker, and Carol each has turned on the "Buddy Finder" feature of their respective mobile device. None of Adam, Baker, or Carol had time (or interest) to create a personal profile or a personal preference list beforehand to specify what kind of person Adam, Baker, or Carol would want to meet.

When Adam turns on the "Buddy Finder" function on mobile device 104, a user interface (UI) on mobile device 104 can send a request to mobile device 104, indicating that Adam intends to participate in social networking. Upon receiving the request, mobile device 104 can enter a "ready" mode, in anticipation for inquiries for matches from other mobile devices. In the "ready" mode setting, mobile device 104 can passively participate in ad hoc networking based on content and location (e.g., can respond to inquires by others).

Alternatively or additionally, Adam can invoke a "Find Friend Now" function of the "Buddy Finder" feature on mobile device 104. The "Find Friend Now" function is an exemplary function backed by ad hoc networking technology based on content and location. Upon invocation of the function, mobile device 104 can actively send inquiries about matches to nearby mobile devices and to server 112. Mobile device 104 can identify nearby mobile devices (e.g., mobile devices 106 and 108). Identification of nearby mobile devices can include sending and receiving signals through a Personal Area Network ("PAN") in which devices 104, 106, and 108 can use a wireless protocol (e.g., Bluetooth® protocol, WiFi) for exchanging data over short distances. Alternatively or additionally, the identification of nearby mobile devices can be performed through server 112 to which mobile devices 104, 106, and 108 are connected through network 110. Server 112 can include one or more processors and instructions that facilitate the performance of various tasks.

Mobile device 104 can identify matches of common music tastes, common activities, common experiences, or common content between Adam, Baker and Carol. The identification can be performed on mobile device 104, mobile devices 106 or 108, or server 112. For example, server 112 can store usage data 114, 116, and 118, which correspond to mobile devices 104, 106, and 108, respectively. Usage data 114, 116, and 118 can include usage history of the mobile devices. The usage history can include records on actions that occur on mobile devices 104, 106, and 108. In some implementations, usage data 114, 116, and 118 can include metadata of multimedia downloads on mobile devices 104, 106, and 108, including, but not limited to, metadata identifying downloaded songs, movies or other content, including names of artists or performers, names of composers or directors, etc.

In some implementations, each of mobile devices 104, 106, and 108 can automatically generate the usage data that can be used for social networking. For example, mobile devices 104, 106, and 108 can each maintain a contact list, including names and phone numbers. The names and phone numbers can be recorded based on caller identification (caller ID) when a mobile devices receives a phone call, or based on phone numbers dialed from the mobile device. Mobile devices 104, 106, and 108 can also maintain browser histories, bookmarks, games played, software downloaded, etc.

In some implementations, when Adam invokes the "Find Friend Now" function on mobile device 104, some or all of the usage data stored on mobile device 104 can be broadcast to the nearby devices (e.g., mobile devices 106 and 108). When the "Buddy Finder" features are enabled on mobile devices 106 and 108, mobile devices 106 and 108 can each perform a matching operation, which can identify common items that are in both the data received from mobile device 104 and data stored locally on mobile devices 106 and 108. For example, mobile devices 104 and 106 can both include a phone number (e.g., (571) 272-1000) in a contact list; mobile devices 104 and 106 can both have city "Waikoloa" added to a weather forecast city list, and both have set radio station KSRC as one of the "favorite radio stations." Mobile devices 104 and 108 can both have web site "theonion.com" in a browser bookmark, and a game "Zombie Pizza" has been played on both of mobile devices 104 and 108. Any one of these common items can be used in ad hoc networking.

Upon identifying the common items, mobile devices 106 and 108 can send indicators to mobile device 104. The indicators can tell mobile device 104 which items are in common, and with which mobile device. Mobile device 104 can display the indicator and the common items. From Adam's point of view, invoking the "Find Friend Now" function has resulted in identification of Baker and Carol, and Adam can see, on mobile device 104, what Adam has in common with Baker and Carol.

In some implementations, when Adam invokes the "Find Friend Now" function on mobile device 104, mobile device 104 can send a social networking request to server 112 through network 110. Network 110 can be a voice network or a data network, or a combination of the two. The request can include location information (e.g., geographic coordinates) of mobile device 104. Server 112 can store usage data 114, 116, and 118 for mobile devices 104, 106, and 108, respectively. Upon receiving the request, server 112 can identify other mobile devices that made social networking requests within a time window of the request from mobile device 104 and then are located within a specific distance from mobile device 104 (e.g., mobile devices 106 and 108).

In some implementations where server 112 is involved, server 112 can find matches between mobile devices 104, 106, and 108 by identifying common items in usage data 114, 116, and 118. For example, server 112 can determine that mobile device 104 and mobile device 106 share common trajectory (e.g., both mobile devices 104 and 106 have been to same places, Paris and Hawaii), that mobile device 106 and mobile device 108 indicate common music taste (e.g., among music downloaded to mobile device 106 and mobile device 108, a certain number of songs are identical), and that mobile device 104 and mobile device 108 both contain pictures of a same person (e.g., by performing a facial recognition analysis on images uploaded from mobile device 104 and mobile device 108).

Server 112 can send notifications to mobile devices 104, 106, and 108, alerting Adam, Baker and Carol that a liked-minded person (e.g., person with common interests or common experiences) is close by. The notification can include the location information submitted by mobile devices 104, 106, and 108. Mobile device 104, 106, and 108 can use the location information to help Adam, Baker, and Carol to find each other. For example, mobile device 104 can include an electronic compass. Using readings of the electronic compass in combination with the location information of mobile device 106, mobile can display a pointer pointing to a general direction where mobile device 106 or mobile device 108 is located, and a distance between mobile device and the other mobile devices.

System 100 can include various mechanisms to protect privacy of each user. For example, usage data of mobile devices 104, 106, and 108 can be created only upon users' explicit consent, either during a sign-up process of the ad hoc networking or through other activities. The usage data can exclude sensitive personal information (e.g., financial transactions, email content, etc.) or any other categories of information that the user may wish to exclude (e.g. web browsing history, usage of specific applications, exact location data, etc.). The usage histories can be used for social networking process only, and only after the users have requested services (e.g., by using the "Buddy Finder" feature). Usage data can be transmitted to other mobile devices only after the users invoke the "Find Friend Now" function. Transmission of the usage data can be encrypted. Some or all of these privacy and security measures can be implemented to ensure that information is gathered and transmitted with user consent, and that the gathered information is secured and is used for legitimate purposes.

Exemplary Ad Hoc Networking Processes

Figure 2A:
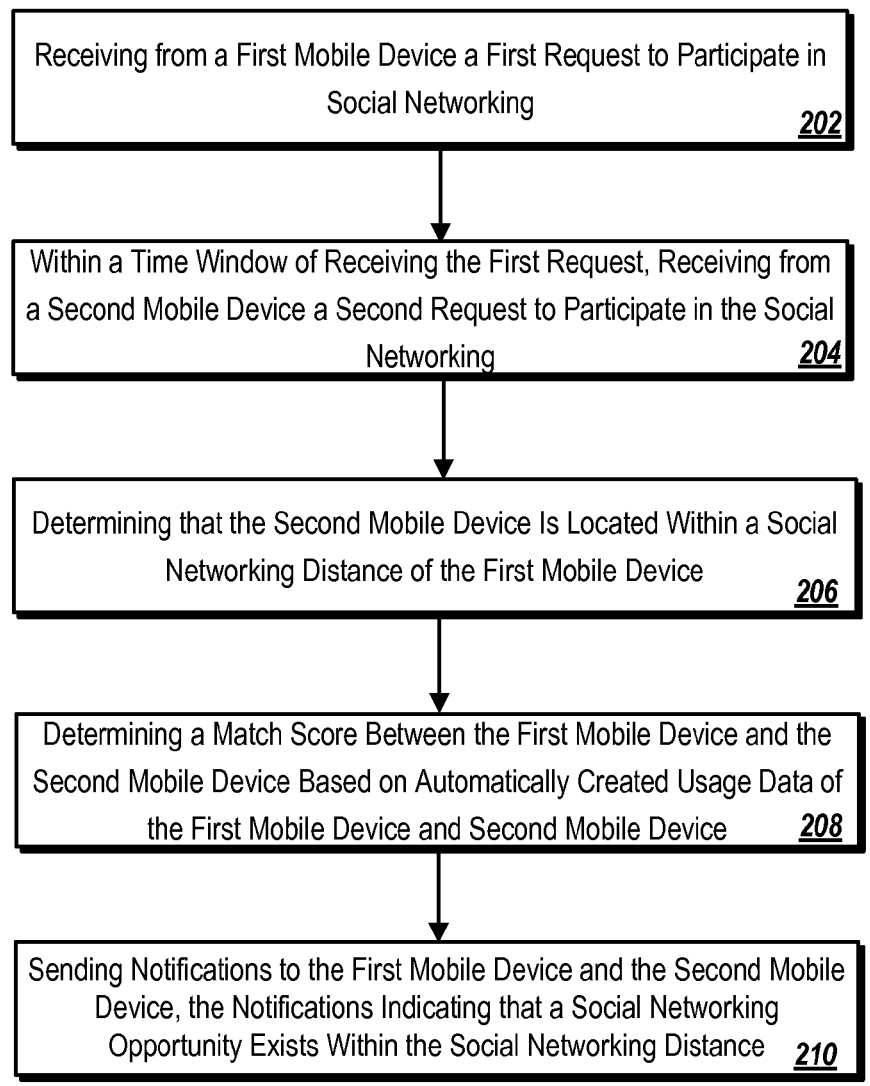
FIGS. 2A-2D are flowcharts illustrating exemplary processes of ad hoc networking based on content and location.

FIGS. 2A-2D are flowcharts illustrating exemplary processes of ad hoc networking based on content and location. FIG. 2A is a flowchart illustrating exemplary process 200 of ad hoc networking based on content and location, where exemplary process 200 is performed on a server. For convenience, exemplary process 200 will be described in reference to server 112, mobile device 104, and mobile device 106.

Server 112 receives (202) from a first mobile device (e.g., mobile device 104) a first request to participate in social networking. The first request can be triggered by a user's activating a feature for ad hoc networking based on content and location (e.g., the "Buddy Finder" feature as described above) on the first mobile device. Alternatively or additionally, the first request can be triggered by a user input invoking, for example, the "Find Friend Now" function as described above. The first mobile device can be a location-aware device that can determine a geographic location of the device using a Global Positioning System (GPS), triangulation of signals, or proximity to known wireless access points (e.g., base stations), among other means. In some implementations, the first mobile device can send coordinates (e.g., a latitude and a longitude) of a current geographic location as part of the request, together with the request, or after the request.

In some implementations, receiving (202) from mobile device 105 a first request to participate in social networking can include receiving a series of location coordinates of mobile device 104 subsequent to the request. A user (e.g., Adam) of mobile device 104 can activate the "Buddy Finder" feature, and expect that wherever Adam goes, Adam can discover, or be discovered by, people with like interests or experiences at or near the location of mobile device 104. Mobile device 104 can transmit the series of location coordinates of mobile device 104 to server 112 using various transmission schemes that can ensure, or at least suggest, that mobile device 104 is a suitable candidate for social networking. In some implementations, mobile device 104 can transmit location coordinates when sending the request to server 112. Server 112 can presume that for a certain period of time (e.g., in a time window) after the request, mobile device will stay at the location. In some implementations, a set of geographic coordinates can be sent to the server at fixed intervals (e.g., every 10 minutes), or when the mobile device moves from one location to another. To reduce the number of transmissions and to ensure that the mobile device is staying at a current location rather than in transit, the mobile device can be configured to transmit a set of geographic coordinates to server 112 when the mobile device has stayed at the a location for a sufficiently long period of time (e.g., 3 minutes), and invalidate the set of geographic coordinates when the mobile device has left the location for a sufficiently long period of time.

Within a time window of receiving the first request, the server can receive 204 from a second mobile device (e.g., mobile device 106) a second request to participate in the social networking. The second request can include, be accompanied by, or be followed by geographic location information of the second mobile device. In some implementations, the time window can be used to reduce a pool of mobile devices that server 112 needs to match. For example, Adam, sitting in a bar, has invoked a "Find Friend Now" function of the "Buddy Finder" feature on mobile device 104. Server 112 can determine that Baker's mobile device 106 is eligible for match identification against Adam's mobile device 104 if Baker has invoked the "Find Friend Now" function of the "Buddy Finder" feature on mobile device 106 the last two hours.

Server 112 can determine (206) whether the second mobile device is located within a social networking distance of the first mobile device. Server 112 can use the social networking distance to determine which mobile devices are eligible for social networking. In some implementations, social networking distance can be a user specified distance within which the user intends to discover like-minded people. The user can specify a radius of a circle, the first mobile device at the center. The second mobile device within the circle is within the social networking distance. The user specified social networking distance need not be precise. For example, the user can specify a current address. Mobile devices located at or near the address can be within the social networking distance. In some implementations, the social networking distance can be determined automatically by the server. The server can provide a default social networking distance which roughly corresponds to a large room (e.g., 15 meters), or corresponds to a precision limit of the location mechanism in the first mobile device. In some implementations, the social networking distance can be determined by the mobile devices based on a wireless transmission range and reception range. For example, the first mobile device can periodical broadcast a token to nearby devices through a Bluetooth® connection. The broadcast can be through a network (e.g., a network based on IEEE 802.11 protocol). The token can include an identifier of the first mobile device.

In case the first mobile device (e.g., mobile device 104) and second mobile device (e.g., mobile device 106) each specifies a distinct social networking distance, determining (206) that the second mobile device is located within a social networking distance of the first mobile device can include determining that the second mobile device is within the minimum social networking distance specified on the mobile devices. For example, Adam of mobile device 104 can specify the social networking distance to be one mile, and Baker of mobile device 106 can specify the social networking distance to be 10 yards. The server can determine that the social networking distance to be 10 yards.

In some implementations, determining (206) that the second mobile device is located within a social networking distance of the first mobile device can include determining that the first and second mobile devices have the same altitude.

Often, people only intend to socialize with other people who are on the same floor of a building. If Adam is in a bar on the first floor of the building and Carol is in an office on the 50th floor of the same building, Adam and Carol are not necessarily located within a social networking distance of each other, even if their latitude and longitude coordinates are the same. Another example would be two people skiing on bottom and top of a mountain. The server can determine that two mobile devices are within social networking distance of one another if the two mobile devices are located at substantially the same altitude.

In some implementations, determining (206) that the second mobile device is located within a social networking distance of the first mobile device can include determining that the first and second mobile devices are at the same venue. A venue can be a place that covers a geographic area. "Hapuna Beach," "de Young Museum," or "Mauna Kea" can be some exemplary venues. Venues can be associated with geographic coordinates using various techniques (e.g., using data from the Topologically Integrated Geographic Encoding and Referencing (TIGER) system of the U.S. Census Bureau). The first and second mobile devices can be within the social networking distance if the first and second mobile devices are both at, for example, the Hapuna Beach of Hawaii Island.

Server 112 can determine (208) a match score between the first mobile device and the second mobile device based on automatically created usage data of the first mobile device and the second mobile device. The match score can measure a confidence level of matches in the usage data based on, for example, how many areas (or categories) of usage data (e.g., trajectory, music taste, book history, browsing history, among others) are matched, as well as how many matches are found in each area of usage data (e.g., three songs are downloaded to both mobile devices 104 and 106 in the last seven days). The automatically created usage data can be retrieved from various sources. Server 112 can identify common items that are in both the usage data of the first mobile device and the usage data of the second mobile device.

In some implementations, determining (208) the match score can include determining similarity between a first content list created for the first mobile device using content items in a first library and a second content list created for the second mobile device using content items in a second library. The first and second content library can include, for example, software programs, digital books, and music libraries stored on mobile devices 104 and 106.

In some implementations, determining (208) the match score can include comparing content lists (e.g., music playlists) generated for each mobile device. The automatically created usage data can include a playlist of songs generated based on the server's analysis of a user's musical preferences using the user's music selection.

For example, user Adam can have an account on server 112, and a library of songs stored on mobile device 104. Upon Adam's request, server 112 can automatically generate a playlist for Adam from the song library stored on mobile device 104. To generate the playlist, server 112 can use a rating system and collaborative filtering, which can be a process of filtering for information or patterns using techniques involving collaboration among multiple users. Information about the Adam's song library can be sent anonymously to a database on server 112. In addition, algorithms can determine which songs to play based on other users' libraries. Server 112 can become more intelligent as data in the database grow. The resulting playlist can contain various numbers (e.g., 25, 50, 75, or 100) of songs and can be refreshed for new results or saved. Server 112 can compare the playlists created for mobile device 104 and mobile device 106. If common songs in the playlist are found, the match score can be incremented. Therefore, for example, if Adam is a fan of an obscure band that other people do not know about, the playlist can identify alternative bands that are at least similar to the obscure band and find Baker who enjoys the alternative bands.

The server can send (210) notifications to the first mobile device and the second mobile device, the notifications indicating that a social networking opportunity exists within the social networking distance. The notification can include a text message, an invocation of client programs running on the first and second mobile devices, or data that can be processed by the client programs. The notification can include location information of the first and second mobile devices. The notification can also include information of the users of the mobile devices. For example, user Baker can have a profile photo and a user name that is available to the public. The profile photo and the user name can be identified in the notification. The notification can further include the match score and a list of the identified common items in the usage data. Identification information of the mobile devices can also be sent, such that a communication channel (e.g., phone call, text messaging, and online chat) can be opened between the first mobile device (e.g., mobile device 104) and the second mobile device (e.g., mobile device 106).

Figure 2B:
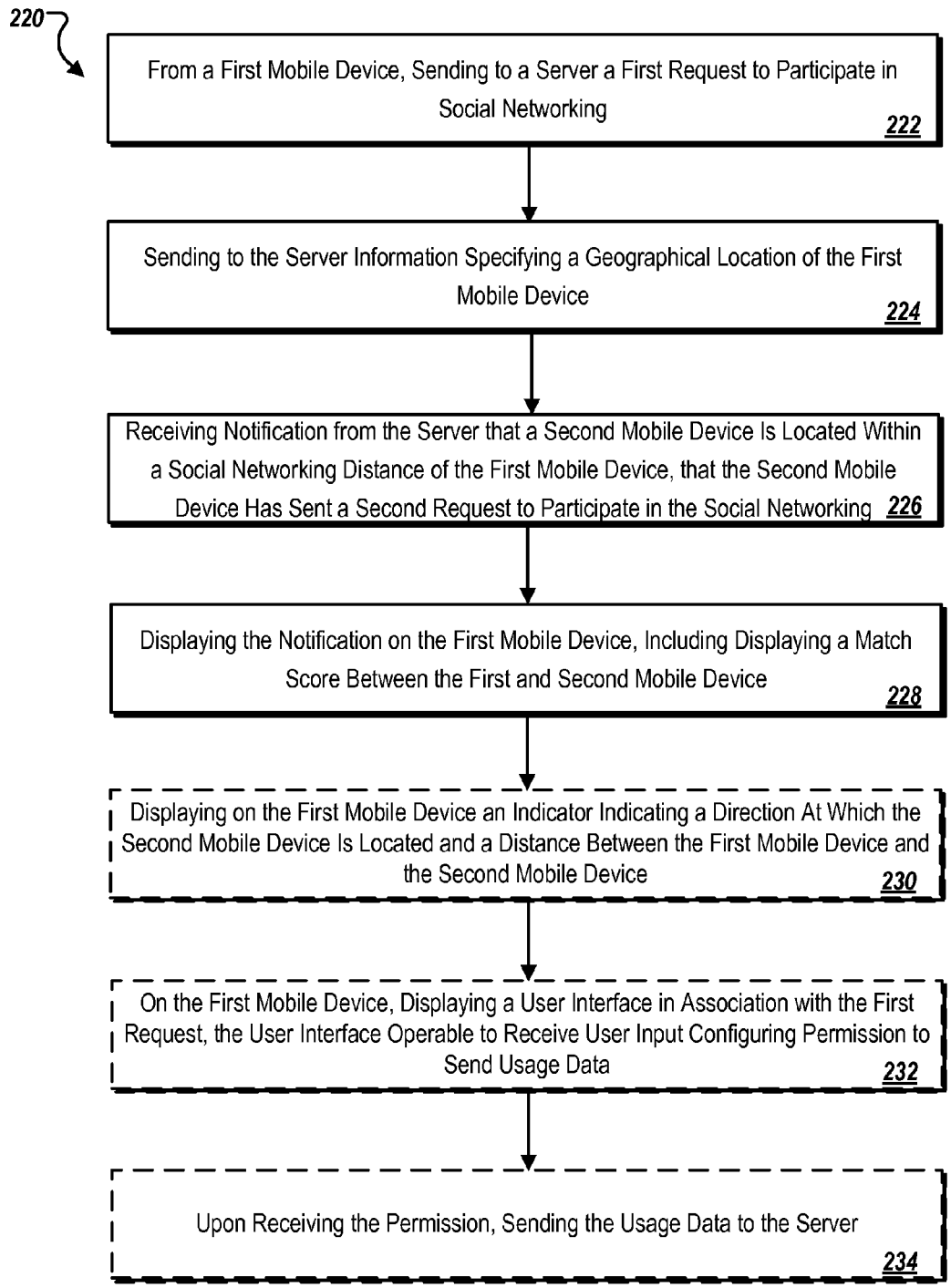

FIG. 2B is a flowchart illustrating exemplary process 220 of ad hoc networking based on content and location, where exemplary process 220 is performed by one or more client devices. A client device can be a location-aware mobile device. For convenience, exemplary process 220 will be described in reference to server 112, mobile device 104, and mobile device 106.

A first mobile device (e.g., mobile device 104) can send (222) to a server (e.g., server 112) a first request to participate in social networking. The first request can be triggered by a user's activating a feature for content based social networking (e.g., Adam activates the "Buddy Finder" feature as described above) on the first mobile device. Alternatively or additionally, the first request can be triggered by a user input invoking, for example, the "Find Friend Now" function as described above.

Mobile device 104 can send (222) to server 112 information specifying a geographic location of mobile device 104. In some implementations, the geographic location is sent to server 112 upon activation of the feature for ad hoc networking based on content and location. Upon exiting the feature, mobile device 104 can send a cancellation signal to server 112, telling server 112 that the location is no longer valid for use in content based social networking. A user (e.g., Adam) can exit the feature by canceling the "Find Friend Now" function or turning off mobile device 104. Mobile device 104 can also exit the feature after a time-out period (e.g., one hour).

In some implementations, the geographical location can be automatically sent to server 112 when mobile device 104 remains at a geographic location for a certain period of time. Mobile device 104 can send a cancellation signal after mobile device leaves the geographic location. For example, Adam activates the "Buddy Finder" feature on mobile device 104. Adam drives to a museum, carrying mobile device 104. Mobile device 104 does not send geographic location coordinates to server 112 when Adam is on the road, because mobile device 104 does not stay at one location for sufficiently long time (e.g., 5 minutes). After Adam enters the museum and stays in the museum for a sufficiently long time, mobile device 104 transmits the geographic location of the museum to server 112. Server 112 can start locating possible matches using the museum location, so as to provide Adam with indications of possible matches among fellow museum visitors. After Adam leaves the museum, the museum location is cancelled, and server 112 stops using the museum location to find matches for Adam.

Mobile device 104 can receive (226) notification from server 112 that a second mobile device (e.g., mobile device 106) is located within a social networking distance of the first mobile device, that the second mobile device has sent a second request to participate in the social networking, and that the first mobile device and the second mobile device share at least one common item in the automatically created usage data of the first mobile device and the second mobile device. The usage data can either be created by mobile devices 104 and 106, or be created by server 112, or be created by both the mobile devices and the server. Server 112 can send the notifications when mobile devices 104 and 106 are located at substantially the same place at substantially the same time. Server 112 can determine that mobile devices 104 and 106 are located at substantially the same place at substantially the same time in a variety of ways. In some implementations, server 112 can require mobile devices 104 and 106 to send the requests within a time window of each other. In some implementations, server 112 can require that mobile devices 104 and 106 are both at a valid (e.g., not cancelled) location. For example, to calculate match scores between mobile devices 104 and 106, server 112 can require that Adam and Baker (both are in the museum) to make the social networking request within x minutes (e.g., 10 minutes) of one another.

Mobile device 104 can display (228) the notification received from server 112. Displaying the notification can include displaying a match score between mobile device 104 and mobile device 106, as well as a providing a user name or a profile image set up for mobile device 106. For example, a profile picture or avatar of Baker can be displayed on mobile device 104.

Mobile device 104 can display (230) an indicator indicating a direction at which mobile device 106 is located. Mobile device 104 can also display a distance between mobile device 104 and mobile device 106.

To send the first request to participate in social networking, mobile device 104 can display (232) a user interface in association with the request. The user interface can be used to receive user permission to transmit usage data from mobile device 104 to server 112. For example, mobile device 104 can request Adam's consent to send location information to server 112 when Adam activates the "Buddy Finder" feature. Upon receiving Adam's permission, mobile device 104 can proceed to send (234) usage data to server 112.

Figure 2C:
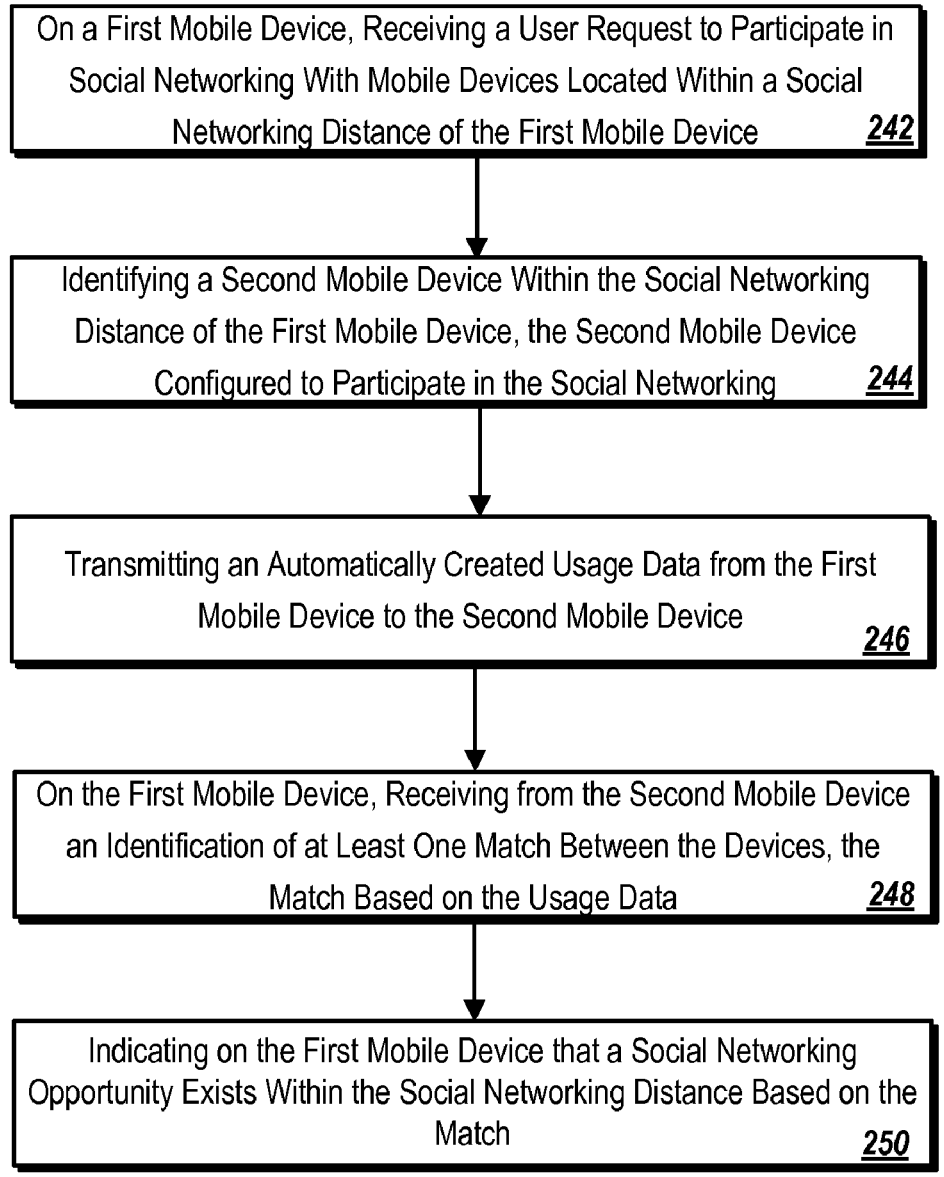

FIG. 2C is a flowchart illustrating exemplary process 240 of ad hoc networking based on content and location, where exemplary process 240 is performed by one or more mobile devices in a peer-to-peer setting. For illustrative purposes, process 240 will be described in reference to mobile devices 104 and 108, which implement exemplary process 240.

A first mobile device (e.g., mobile device 104) can receive (242) a user request to participate in social networking with mobile devices located within a social networking distance of the first mobile device. The request can be received through a user interface. The social networking distance can be determined by a wireless transmission range and a wireless reception range. The wireless transmission range can be determined by how far away an intelligible wireless signal can be transmitted from the mobile device. The wireless reception range can be determined by how far away a signal transmitted can be received on the mobile device. Wireless reception range can vary based on the strength of the signal transmitted.

Mobile device 104 can identify (244) a second mobile device (e.g., mobile device 108) within the social networking distance of the first mobile device, the second mobile device configured to participate in the social networking. Identifying mobile device 108 can include broadcasting a signal indicating mobile device 104 is ready to participate in ad hoc networking based on content and location. Mobile device 104 can also send information on geographic location of mobile device 104 to mobile device 108, so that mobile device 108 can determine whether mobile device 104 is within a social networking distance as defined on mobile device 108. If mobile device 104 is located within the social networking distance of mobile device 108, mobile device 104 can proceed to a next stage of the process.

Mobile device 104 can transmit (246) automatically created usage data to mobile device 108. In some implementations, the usage data can include a trajectory of mobile device 104, which can include a collection of time and places where mobile device 104 has visited. In some implementations, with the user's consent the usage data can contain web browsing history, web browsing bookmarks, and membership at common content provider websites. The membership at common provider website can be determined by user account information (e.g., username and password combination) in association with a web address of the content provider. For example, the usage data can include information that indicates Adam has membership in various social networking websites. However, the actual username and password need not be transmitted. In some implementations, the usage data can include multimedia content usage history. The multimedia content usage history can include history of music and video downloads, song and movie purchases, radio station or television station the mobile device has tuned to, books purchased, games played, etc. In some implementations, the usage data can include phone numbers dialed, contact list created in email and text messaging communications.

Mobile device 104 can receive (248) from mobile device 108 an identification of at least one match between mobile device 104 and mobile device 108. The match can be based on the usage data. For example, the match can be a same book download to both mobile device 104 and mobile device 108. The match can be a common friend. For example, when a third-person Jeff is in contact lists of both mobile device 104 and mobile device 108, Jeff can be regarded as a common friend of both Adam and Carol. A contact list entry based match can be identified. The match can also be based on music or video choice. For example, if mobile device 104 contains a certain number of songs from a certain artist group, and mobile device 108 contains songs from the same artist group, a match can be identified.

Mobile device 104 can indicate (250) that a social networking opportunity exists within the social networking distance based on the match. Indicating that a social networking opportunity exists can include displaying on a user interface of mobile device that a number of people are in the vicinity of mobile device 104, that the people are also seeking social networking network opportunities, and that Adam and the people can have similar tastes or experiences. Mobile device 104 can display the following exemplary match information about Carol of mobile device 108 in various match areas. Carol enjoys the rock band Coldplay, which Adam also enjoys. Carol has downloaded three books of Jules Verne, who is Adam's favorite author. Carol has the website "theonion.com" bookmarked in a web browser. Adam has the same bookmark. Furthermore, mobile device 104 can indicate to Adam that Carol is located 15 yards away from Adam, at 2 o'clock position. Mobile device 104 can suggest to Adam a variety of ways to communicate to Carol. For example, mobile device 104 can provide user interfaces for Adam to send Carol an email, to invite Carol to a chat, or direction indicators pointing to Carol's location such that Adam can walk to Carol and start a conversation.

Figure 2D:
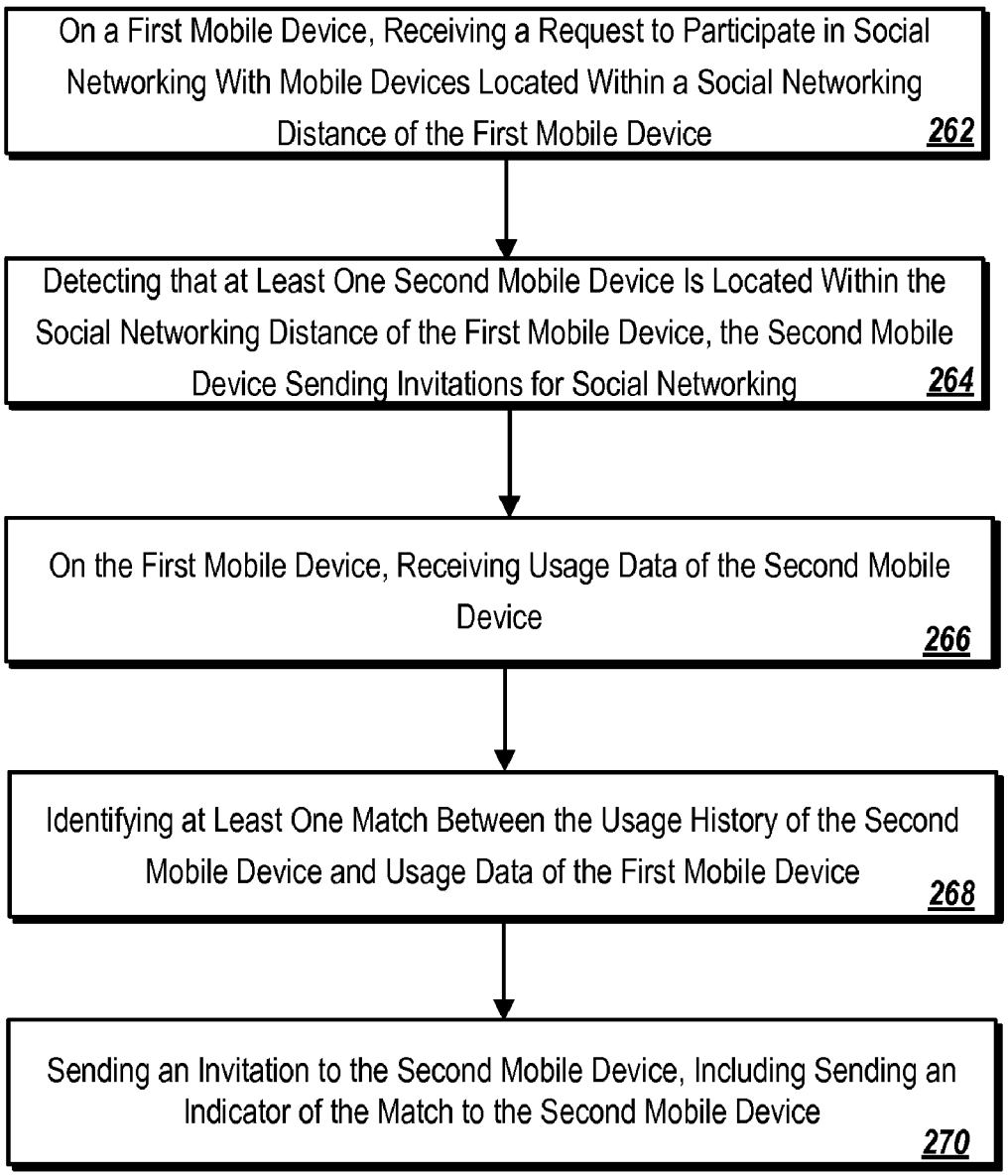

FIG. 2D is a flowchart illustrating exemplary process 260 of ad hoc networking based on content and location, where exemplary process 260 is performed by one or more mobile devices in a peer-to-peer setting. For illustrative purposes, process 260 will be described in reference to mobile devices 104 and 108, which implement exemplary process 260.

A first mobile device (e.g., mobile device 104) can receive (262) a user request to participate in social networking with mobile devices located within a social networking distance of the first mobile device. Mobile device 104 can receive (264) from another mobile device (e.g., mobile device 108) a broadcast signal indicating mobile device 108 is ready to participate in content based social networking. Mobile device 104 can further receive geographic information from mobile device 108 during or after receiving the broadcast signal from mobile device 108. Mobile device 104 can use the received geographic information to determine whether mobile device 108 is located within the social networking distance as defined on mobile device 104.

In some implementations, if mobile device determines that mobile device 108 is located within the social networking distance as defined on mobile device 104, mobile device 104 can send the geographic coordinates of mobile device 104 to mobile device 108, such that mobile device 108 can determine whether mobile device is within a social networking distance as defined on mobile device 108. Further social networking actions can occur when both mobile device 104 and mobile device 108 acknowledge that the mobile devices are within a social networking distance of each other. For example, mobile device 104 and mobile device 108 can communicate with each other through PAN. If mobile device 104 has an effective reception range of 10 meters and effective transmission range of 10 meters, and mobile device has an effective reception range of 10 meters and effective transmission range of 5 meters, mobile device 104 and mobile device 108 are in transmission range of each other if mobile device 104 and mobile device 108 are within 5 meters of each other. For another example, in addition to communicating with each other through PAN, mobile devices 104 and 108 can also communicate with each other through an International Mobile Telecommunications-2000 (commonly known as 3G) network. Adam can specify a social networking distance to be determined by a current venue (e.g., a 0.5 miles long, 200 feed wide area of Hapuna Beach, Hawaii Island), while Carol specifies that a social networking distance is 20 meters. Mobile device 104 and mobile device 108 are in transmission range of each other if mobile device 104 and mobile device 108 are within 20 meters of each other.

Mobile device 104 can receive (266) usage data of mobile device 108. Mobile device 104 can identify (268) a match between the received usage data of mobile device 108 and usage data stored on mobile device 104. The usage data can include a list of recently played music pieces or video pieces, recently accessed web sites, a music genre configured on mobile device 104, a list of recently played electronic games, etc.

Mobile device 104 can send (270) an invitation to mobile device 108 to start social networking, including sending an indicator of the identified match to the mobile device 108. In some implementations, sending the invitation can include requesting user permission to send the invitation. A user can start as a passive participant in the social networking. For example, Adam can browse a list of matches before allowing other people to see Adam as a match.

Ad Hoc Networking Based on Trajectory

Figure 3:
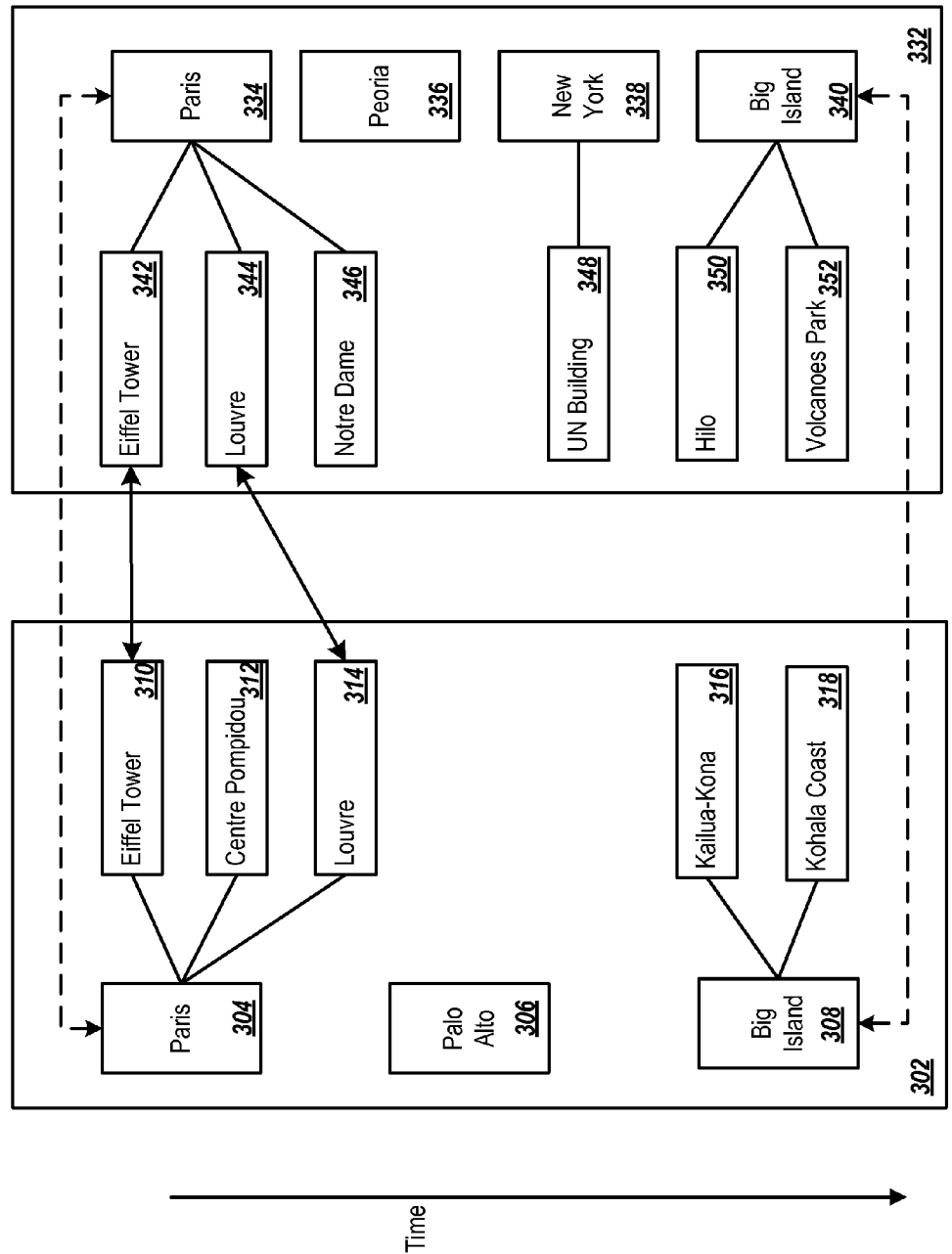
FIG. 3 illustrates exemplary implementations of ad hoc networking based on content and location where trajectories of mobile devices are used for identifying matches.

FIG. 3 illustrates exemplary implementations of ad hoc networking based on content and location where trajectories of mobile devices are used for identifying matches. Trajectories 302 and 332 can be created automatically for location-aware mobile devices. A trajectory of a mobile device can include a list of places the mobile device has visited. The places visited can each be identified by an entity in a database, the entity representing a venue.

In some implementations, a server (e.g., server 112) can maintain a list of venues. Each venue can be associated with a set of geographic coordinates. When a mobile device moves substantially close to the geographic coordinates of a venue, the server can record that the mobile device has visited the venue. The server can detect that the mobile device is substantially close to the geographic coordinates of the venue based on position data received from the mobile device. In some implementations, a user's dwell time in a particular venue can be used to determine whether the server records that the mobile device has visited the venue. Dwell time can be determined automatically by starting a timer when the user enters a defined geofence boundary around the venue or location (e.g., a circle having a defined radius enclosing the venue or location) and stops the timer when the user exits the geofence boundary. In some implementations, the mobile device records venue or other locations of interest in local cache and uploads the locations to the server later.

The list of venues can be generated from publicly available data (e.g., TIGER files), from various mapping software, or from analysis of popularity of user-performed search. For example, a server can include a geographic database that contains a vast number of addresses and names of places. When the server receives a sufficient number of user queries including a particular address on a mapping service backed by the geographic database, the server can add the address in the query to a venue list. Thus, the server can exclude from the venue list addresses that contain too much detail or addresses that are unpopular. For example, it is possible that a place "Belmont, Calif. 94002" is in a venue list while "151 Irene Court, Belmont, Calif. 94002" is excluded. Trajectory 302 can be created based on the records.

For example, based on the venue list and received location information, the server can determine that mobile device 104 has traveled to Paris, Palo Alto, and Big Island of Hawaii. Corresponding records 304, 306, and 308 can be included into trajectory 302. Furthermore, multiple layers of venues can be recorded. For example, in addition to "Paris," the server can determine that mobile device 104 has been to "France" and "Europe." In addition, the venue list can include sufficiently detailed information such that the server can identify that mobile device 104 has visited Eiffel Tower, Centre Pompidou, and Louvre in Paris. Corresponding records 310, 312, and 314 can be included in trajectory 302.

In some implementations, a mobile device can create at least a portion of trajectory 302. A mobile device may have visited places that, although valid entries in the geographical database on the server, are excluded from the venue list because, for example, too few searches on the venue name has occurred. In such situations, the mobile device can record the place into trajectory 302 if, for example, the search using the place as a search term is performed on the mobile device, and the mobile device has visited the searched place. For example, a user can search for places "Kailua-Kona" and "Kohala Coast" on mobile device 104, and subsequently take mobile device 104 to Kailua-Kona and Kohala Coast of Hawaii Island ("Big Island"). Thus, even if venues "Kailua-Kona" and "Kohala Coast" are not in the venue list, records 316 and 318 can be entered into trajectory 302.

In some implementations, trajectory 302 can be synchronized between the server and mobile device 104. For example, server created portions of trajectory 302 (e.g., records 304, 306, 310, 312 and 314) can be downloaded from the server to mobile device 104. Mobile device 104 created portions of trajectory 302 (e.g., records 316 and 318) can be uploaded to the server from mobile device 104. Records on trajectory 302 can be ordered based on a time of visit.

In some implementations, trajectory 302 of mobile device 104 can be compared with trajectory 332 of another mobile device (e.g., mobile device 106) to identify common experience between users. The comparison can be performed on mobile device 104, mobile device 106, or server 112. During the comparison, records that point to identical venues are identified. For example, trajectory 332 includes records 342, 344, 346, 348, 350, and 352 showing that mobile device 106 has visited Eiffel Tower, Louvre, Notre Dame, United Nations building, Hilo, and Volcanoes State park. Among these, records 342 and 344 of trajectory 332 match records 310 and 314 of trajectory 302, indicating that both mobile device 104 and mobile device 106 have been to Eiffel Tower and le Louvre.

In addition, matches can be identified at various levels. Places such as visited Eiffel Tower, Louvre, and Notre Dame can be considered lower level, because they are encompassed by a higher lever venue, Paris, which can also be used for matching purposes. For example, records 304 and 308 of trajectory 302 match records 334 and 340 of trajectory 332, indicating that both mobile device 104 and mobile device 106 have been to Paris and Hawaii Island. In some implementations, matches at a lower level match (e.g., "Eiffel Tower") can result in a higher match score than a higher-level match (e.g., "Paris" or "France"), indicating that the commonality between mobile device 104 and mobile device 106 is more concrete.

Ad Hoc Networking Based on Feature Recognition

Figure 4:
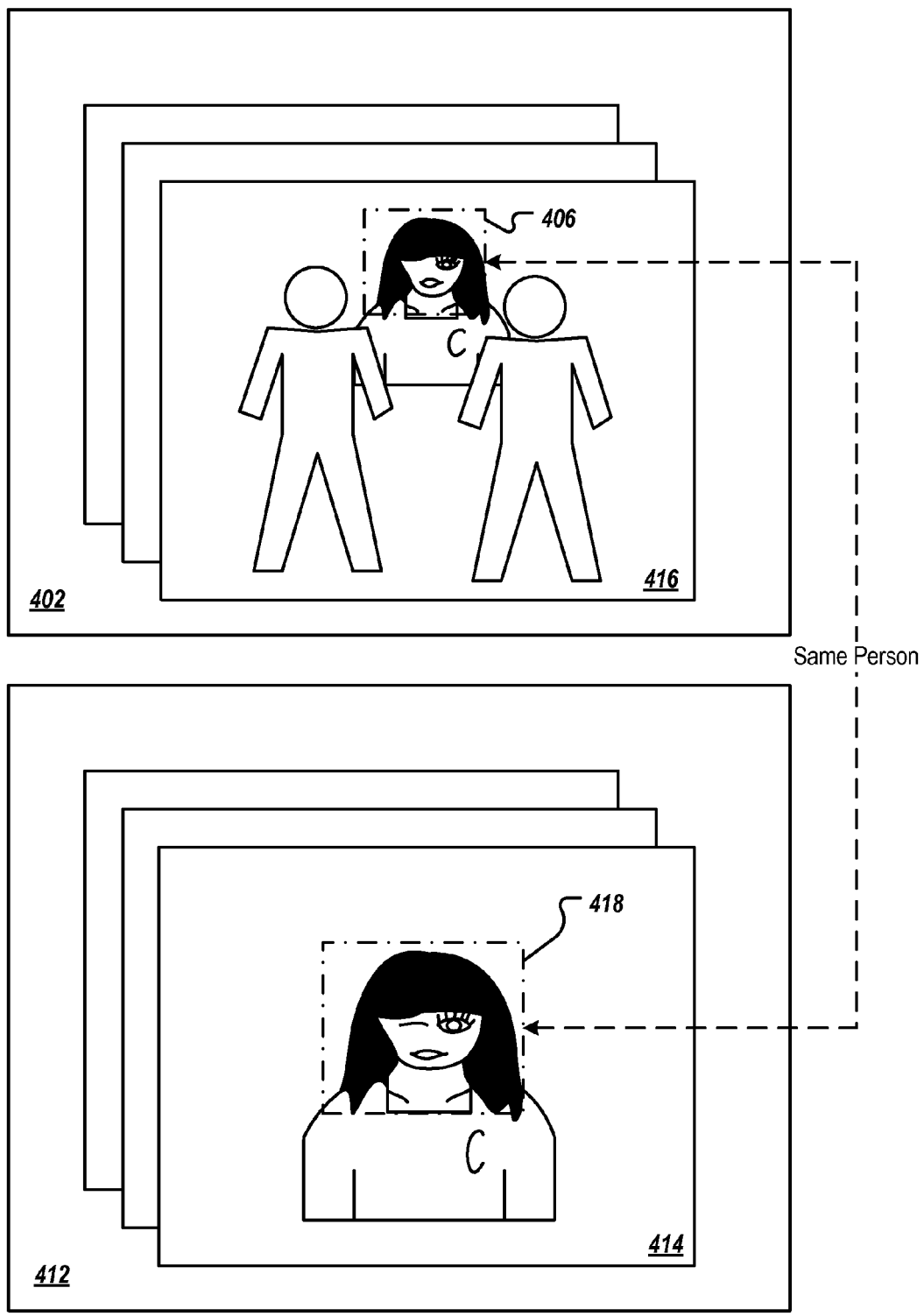
FIG. 4 illustrates exemplary implementations of ad hoc networking based on content and location where images from mobile devices, combined with facial recognition techniques, are used for identifying matches.

FIG. 4 illustrates exemplary implementations of ad hoc networking based on content and location where images from mobile devices, combined with facial recognition techniques, are used for identifying matches and calculating match scores. In some implementations, determining the match score can include recognizing that one or more first documents uploaded from a first mobile device and one or more second documents uploaded from a second mobile device relate to one or more common subjects, including identifying the common subjects from the first and second documents using feature identification technology. The match score can be calculated based on a count of the common subjects.

A mobile device (e.g., mobile device 104) can upload content 402 to a server. A feature recognition algorithm can recognize particular features in uploaded content 402 and associate the recognized features with other content. For example, uploaded content 402 can include one or more images of various people. Server 112, on which the feature recognition algorithm is executed, can include a program that can automatically detect and recognize faces in the images in content 402. A facial detection function of the program can identify faces of people in the images. A facial recognition function of the program can match faces that look like the same person. In some implementations, the feature recognition algorithm can be executed by mobile device 104, when a digital picture is taken by mobile device 104. Some examples of feature recognition algorithms can be found in U.S. patent application Ser. No. 12/436,069, for "ORGANIZING IMAGES BY CORRELATING FACES," Attorney Docket No. P7336US1/18814-00129001, filed May 5, 2009, which patent application is incorporated by reference herein in its entirety.

For example, user Adam can upload an image from mobile device 104 to server 112 and tag the image using a name in Adam's contact list (e.g., "Jeff"). The uploaded image can contain a portrait of a face. The server can thus associate "Jeff" with the face. If Adam subsequently uploads images that contain facial portraits, server 112 can determine whether "Jeff" is in the image. Server 112 can also determine whether images uploaded by another user "Baker" include "Jeff." In some implementations, when Adam or Baker subsequently upload images containing Jeff's face, server 112 can automatically present the name "Jeff" as a tag to be applied to the images.

In FIG. 4, content 402 uploaded from mobile device 104 and content 412 uploaded from another mobile device (e.g., mobile device 108) can be used in ad hoc networking based on content and location. At least one image 416 of content 402 contains a particular face 406, which the server can identify with certain amount of confidence as belonging to a particular person. At least one image 414 of content 412 contains a face 418, which server 112 can also identify as belonging to the same particular person. Server 112 can determine that the particular person is a common item in usage data of mobile devices 104 and 108, and can send a notification to both mobile device 104 and mobile device 108 that they have both uploaded a picture of the same person.

In some implementations, the server can send the notice to the device when face 406 is recognized to be a person, and the person is located close by. For example, user Adam can take picture 416 at a gathering (e.g., a party) of a group of people, including Carol, whom Adam did not know. When Carol gets near Adam at a later occasion (e.g., in venue 102), the server can identify that there is a match because Carol has uploaded many pictures of herself (e.g., content 414), which can be mapped to the face in Adam's picture 416. If picture 418 is a picture designated by Carol as a profile picture, the server can give Carol a high match score, indicating that not only Adam and Carol share pictures of a same subject, but Carol is also the subject in one of Adam's pictures.

Exemplary User Interfaces of Ad Hoc Networking

Figure 5A:
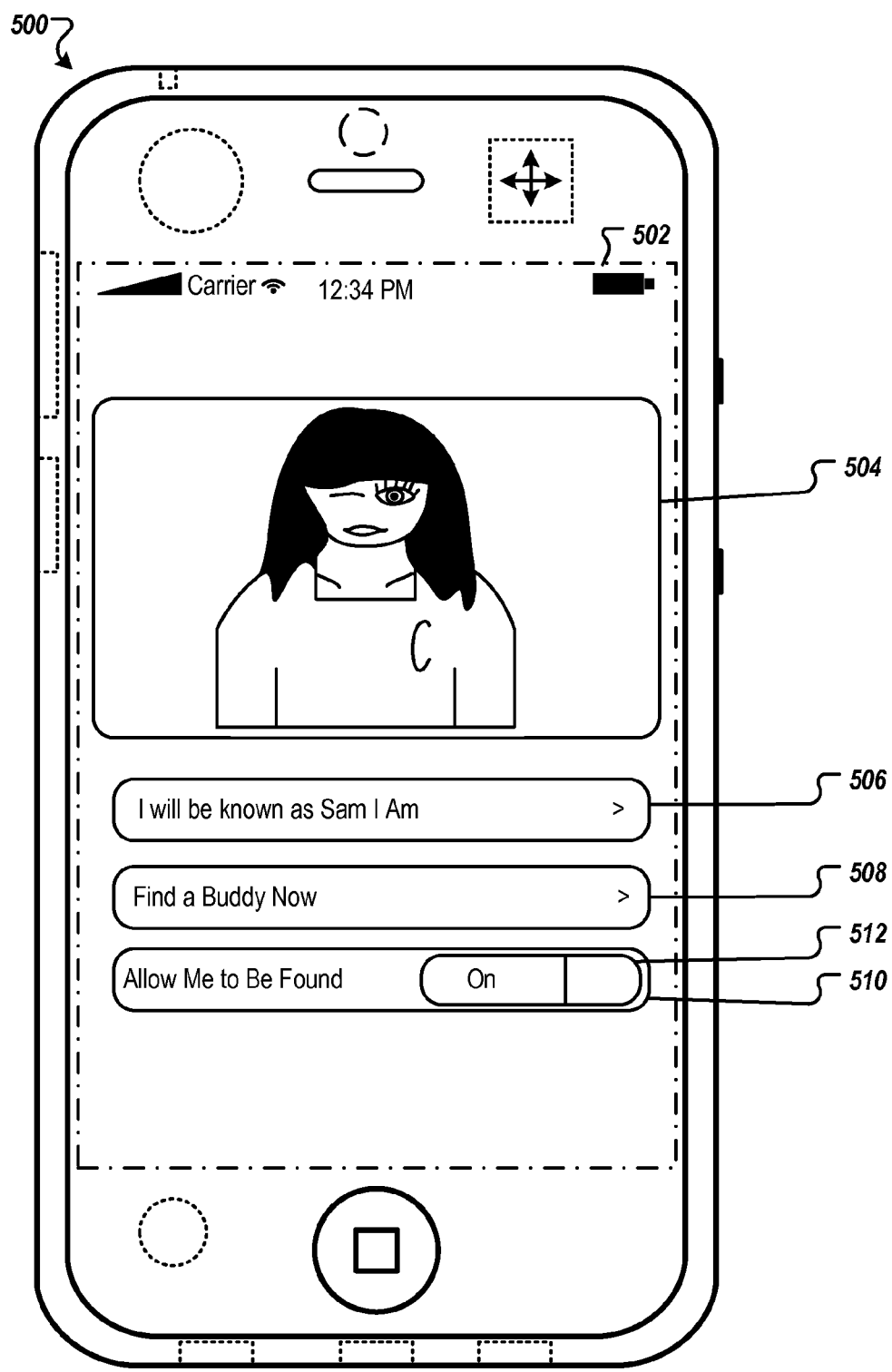
FIGS. 5A-5D illustrate exemplary user interfaces for ad hoc networking based on content and location.

FIGS. 5A-5D illustrate exemplary user interfaces for ad hoc networking based on content and location. FIG. 5A illustrates an exemplary user interface for activating a ad hoc networking based on content and location feature on a mobile device 500. Mobile device 500 can be, for example, a handheld computer, a personal digital assistant, a cellular telephone, a network appliance, a camera, a smart phone, an electronic tablet, an enhanced general packet radio service (EGPRS) mobile phone, a network base station, a media player, a navigation device, an email device, a game console, or a combination of any two or more of these data processing devices or other data processing devices.

In some implementations, mobile device 500 can include touch-sensitive display 502 or pad. Touch-sensitive display 502 can implement liquid crystal display (LCD) technology, light emitting polymer display (LPD) technology, or some other display technology. Touch sensitive display 502 can be sensitive to haptic and/or tactile contact with a user.

In some implementations, touch-sensitive display 502 can be a multi-touch sensitive display 502. Multi-touch-sensitive display 502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, mobile device 500 can display one or more graphical user interfaces on touch-sensitive display 502 for providing the user access to various system objects and for conveying information to the user. In some implementations, the graphical user interface can include one or more display objects 504, 506, 508, 510, and 512. In the example shown, touch-sensitive display 502 can display a profile image 504. Profile image 504 can include a picture that a user of mobile device 500 designates as available to other users for purposes of presenting the user to other like-minded people in the ad hoc networking process. In some implementations, the user can select profile image 504 from pictures stored on mobile device 500. The pictures can be created using a digital camera function of mobile device 500, or downloaded from various servers over a communications network. The user can change profile image 504 by touching an area of touch-sensitive display 502 that is occupied by profile image 504.

Control 506, when being tapped upon, can allow the user to create a user identifier that the user intends to be made available to other users who may be identified as like-minded people in the content based social networking process. To protect privacy of the user, the user identifier is not necessarily based on or related to an actual name or user account of the user. For example, user Carol can give herself a user identifier "Sam I Am" with which she will be known to others in content-based match making. In some implementations, the user can enter an edit mode to modify the identifier by tapping a ">" sign at right side of button 506.

Control 508, when being tapped upon, can allow a user to invoke a function that actively seeks matches in nearby locations. For example, tapping button 508 can invoked the "Find Friend Now" function as described above in reference to FIG. 1. In some implementations, actively seeking matches can include sending signals to nearby devices such that the nearby devices, if configured to allow being discovered, transmit usage data to mobile device 500. A mobile device is "nearby" if the mobile device is within a social networking distance of mobile device 500. In some implementations, the user can enter a configuration mode to define what constitutes a "social networking distance" by tapping a ">" sign at right side of button 508. Further details on how to define what constitutes a "social networking distance" will be described below with reference to FIG. 5B.

Control 510 can be used by the user to activate the ad hoc networking feature (e.g., the "Buddy Finder" feature as described above). In some implementations, activating the ad hoc networking feature can include permitting usage data of mobile device 500 to be transmitted to other mobile devices. In some implementations, control 510 can include on/off switch 512, which can display a current status of the ad hoc networking feature. For example, an "on" of on/off switch 512 can indicate that the ad hoc networking feature is active. The feature can be turned off by tapping a blank portion of on/off switch 512 or gesture or motion.

Figure 5B:
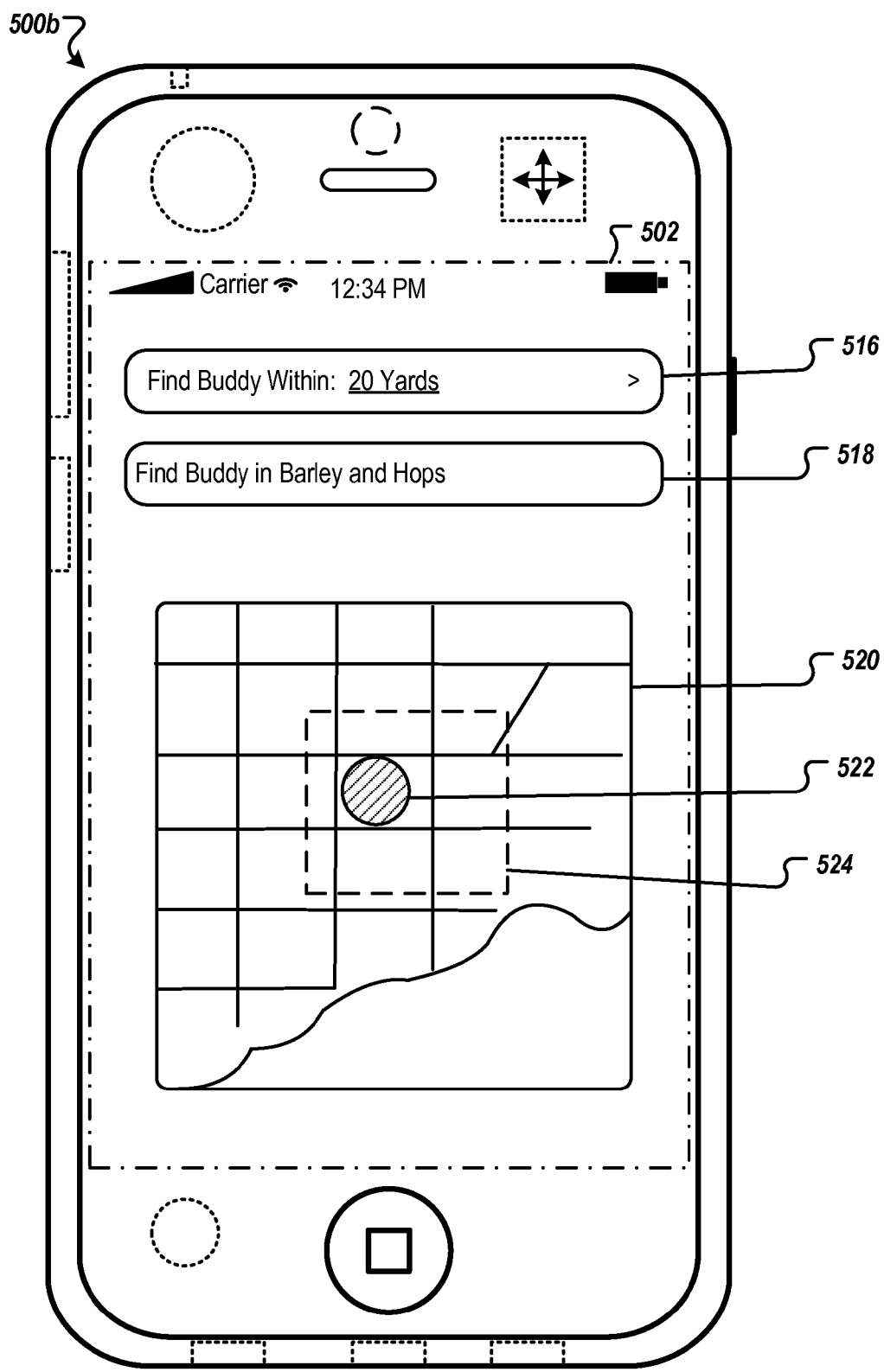

FIG. 5B illustrates an exemplary user interface for configuring a social networking distance on a mobile device 500b. Control 516 can allow a user to define a radius within which ad hoc networking based on content and location can occur. The radius can be an approximate distance (e.g., 20 yards, etc.). By tapping on control 516, the user can change the distance. In some implementations, the user can tap a ">" sign located at a right portion of control 516 to use alternative ways to configure the radius. For example, the radius can be determined by a Bluetooth® or WiFi transmission or reception range, or effective range of a base station to which mobile device 500b is connected. In such cases, mobile devices that are located within the Bluetooth® or WiFi communication range or mobile devices that are wirelessly connected to the base station can be regarded as located within the social networking distance.

Control 518 can allow a user to define a social networking distance using a current venue of mobile device 500b. The venue can be identified by the current geographic location of mobile device 500b and a venue list on a server. For example, if the current geographic located of mobile device 500b is determined to coincide with bar and restaurant "Barley and Hops" as stored on the server, the server can send the information to mobile device 500b. By tapping on control 518, the user can tell mobile device 506 that all mobile devices currently in "Barley and Hops" are within the social networking distance.

The user can also specify a social networking distance using map 520. Map 520 can show a current location 522 of mobile device 500b. The user can scroll the map by, for example, touching the map using a finger and dragging the finger across touch sensitive display 502. The user can zoom in or zoom out by, for example, touching the map using two fingers and increasing or decreasing the distance between the two fingers (e.g., a pinching gesture). To specify a social networking distance, the user can draw bounding area 524 on map 520 using the finger or another pointing device. Bounding area 524 can be a circle, a polygon, or any free-style shape. Mobile device 500b can trace the user's finger movements and display the bounding area, for example, by drawing a border around bounding area 524 or highlighting bounding area 524. Bounding area 524 can be configured to expire after mobile device 500b moves outside bounding area 524 for a certain period of time (e.g., 3 minutes).

Figure 5C:
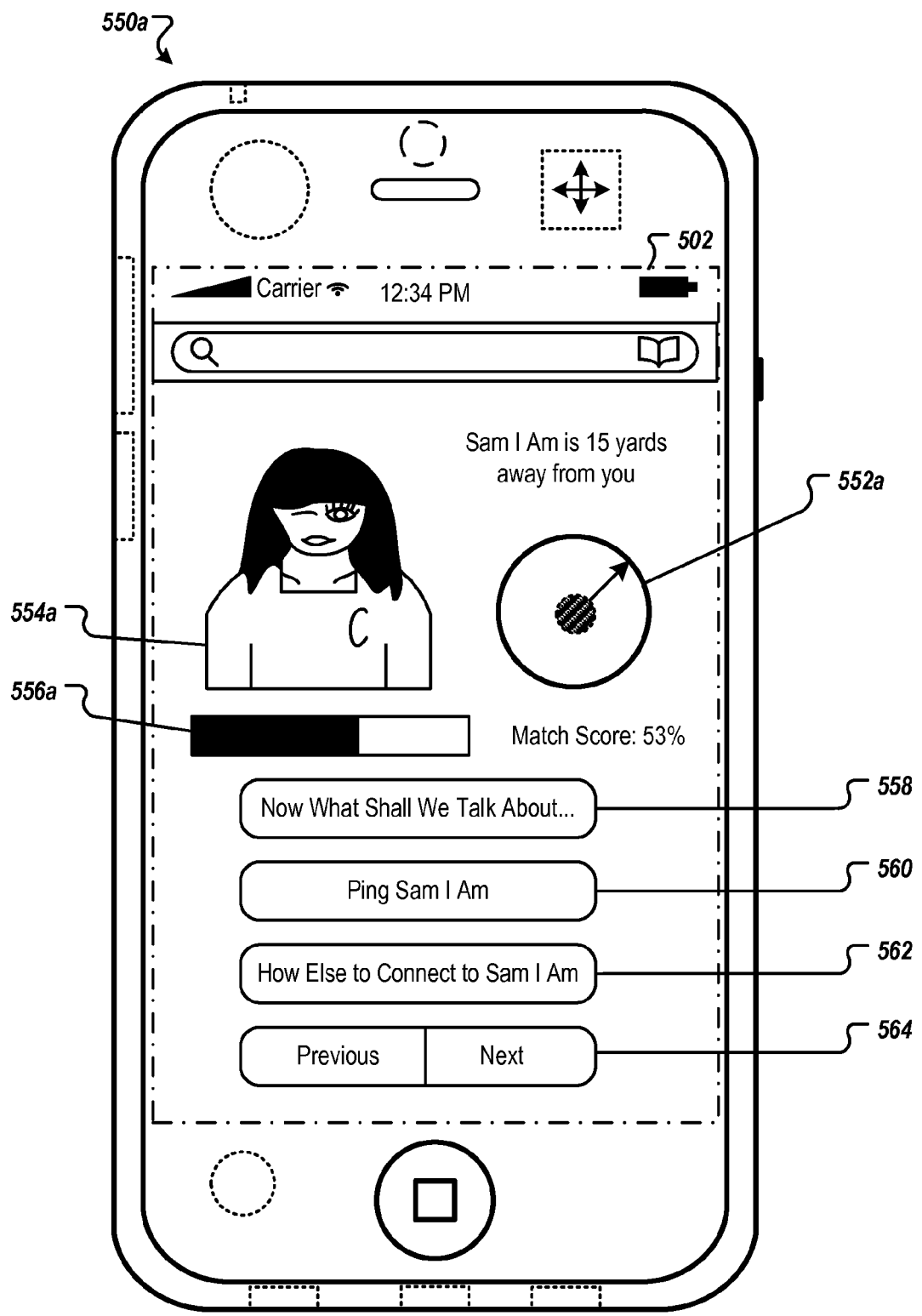

FIG. 5C illustrates an exemplary user interface for indicating that a social networking opportunity exists for mobile device 550a. In the example shown, mobile device 550a presents to a user of mobile device 550a (e.g., Baker) a person (e.g., Carol) who has interests or experiences potentially similar to that of Baker. Carol's profile image 554a can be displayed on mobile device 550a, as well as a match score. The match score can be displayed in text form, graph form (e.g., bar graph 556a), or both. The match score can either be a count. Carol's user ID (e.g., "Sam I Am") can be displayed on mobile device 550a, as well.

Direction indicator 552a can include a pointer (e.g., an arrow) that points to the direction of Carol, and a dial in which the pointer is set. The direction can be determined by the relative position of mobile device 550a and Carol's mobile device, as well as by a position of mobile device 550a. For example, when mobile device 550a is in a substantially horizontal posture (e.g., being put face up on a flat surface), if mobile device 550a is turned clockwise or counter clockwise while lying flat, the pointer in direction indicator 552a can remain pointing to Carol's direction. Direction indicator 552a can maintain the correct direction using an electronic magnetometer internal to or coupled with mobile device 550a.

Mobile device 550a can also display a distance between mobile device 550a and Carol's mobile device. The distance can be displayed as text (e.g., "Sam I Am is 15 yards away from you") or graphically (e.g., as a dot, triangle, or other shaped icon displayed in conjunction with direction indicator 552a). Other representations of directions and distances are possible, the example of some of which will be described below with respect to FIG. 5D.

Control 558, when tapped, can lead the user (Baker) to another user interface screen that displays common interests or experiences between Baker and Carol. Control 560 can be used to open various communication channels between mobile device 550a and Carol's mobile device. For example, Baker can tap control 560 to enter a screen where Baker can select whether to email Carol, send a text message to Carol, or call Carol's mobile device number.

Control 562 can allow the user (Baker) to use alternative means to communicate with the identified person (Carol). For example, Baker can invite Carol to participate in a multiplayer online game, offer to share multimedia files stored on mobile device 550a, or invite Carol to join a web-based social network.

Control 564 can allow the user (Baker) to browse through a list of like-minded people that mobile device 550a has identified. The identified people can be ordered in a list according to the match score. For example, Baker can tap "Previous" or "Next" to navigate up or down the list.

Figure 5D:
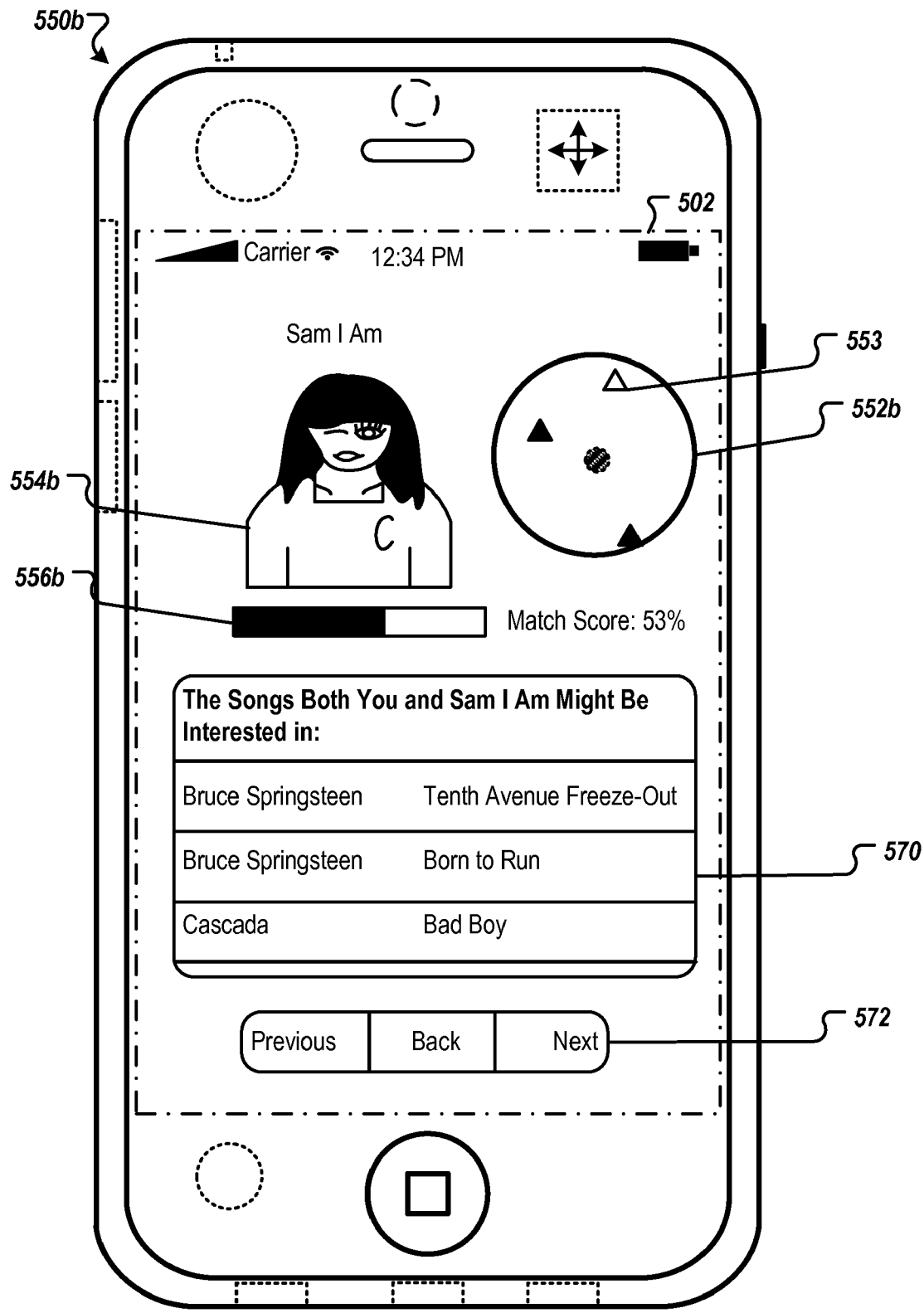

FIG. 5D illustrates an exemplary user interface for displaying matching items on mobile device 550b. In some implementations, the user interface of FIG. 5D can be activated, for example, by a user's tapping control 558 of FIG. 5C. In some implementations, the user interface can be activated directly in response to a user request to find a like-minded person (e.g., when a user taps on control 508 of FIG. 5A).

Mobile device 550b can display a profile photo 554b and a user ID (e.g., "Sam I Am) on a display. Bar graph 556b can be used to display a match score calculated in the ad hoc networking process. Direction indicator 552b can be in a form of a radar screen, where mobile device 550b is represented by a circle at the center, and other mobile devices on which one or more match items are found are displayed as blips (e.g., triangles) on the radar screen. The relative positions between the blips and the center of the radar screen can indicate directions and distances of the other mobile devices. The user can select to view matching items from a particular mobile device by tapping the blip of the mobile device. A current mobile device, e.g., one whose matching items are being displayed on mobile device 550b, can be indicated on the radar screen of direction indicator 552b by a highlighted blip (e.g., highlighted triangle 553).

Display area 570 can display identified common items that relate to both mobile device 550b and the other mobile device (e.g., the device of "Sam I Am"). For example, display area 570 can display a list of songs that both the user and "Sam I Am" have downloaded within a period of time (e.g., 1 week) before a current time, or a list of songs that are in the playlists supplied by the server for mobile device 550b and the device of "Sam I Am," or both. The user can scroll up or down the display by dragging a finger or another pointing device up or down display area 570.

In addition to common music interest, display area 570 can also display items related to other areas that can indicate common interest or experience (e.g., a list of places both the user and "Sam I Am" have visited, a list of books that both the user and "Sam I Am" have purchased, etc.). The user can navigate the area of interest using control 572 of the user interface. For example, tapping "Previous" of control 572 can cause display area 570 to display the list of places visited, and tapping "Next" of control 572 can cause display area 570 to display the list of books purchased, etc. The user can exit the user interface by tapping "Back" on control 570.

Network Operating Environment

Figure 6:
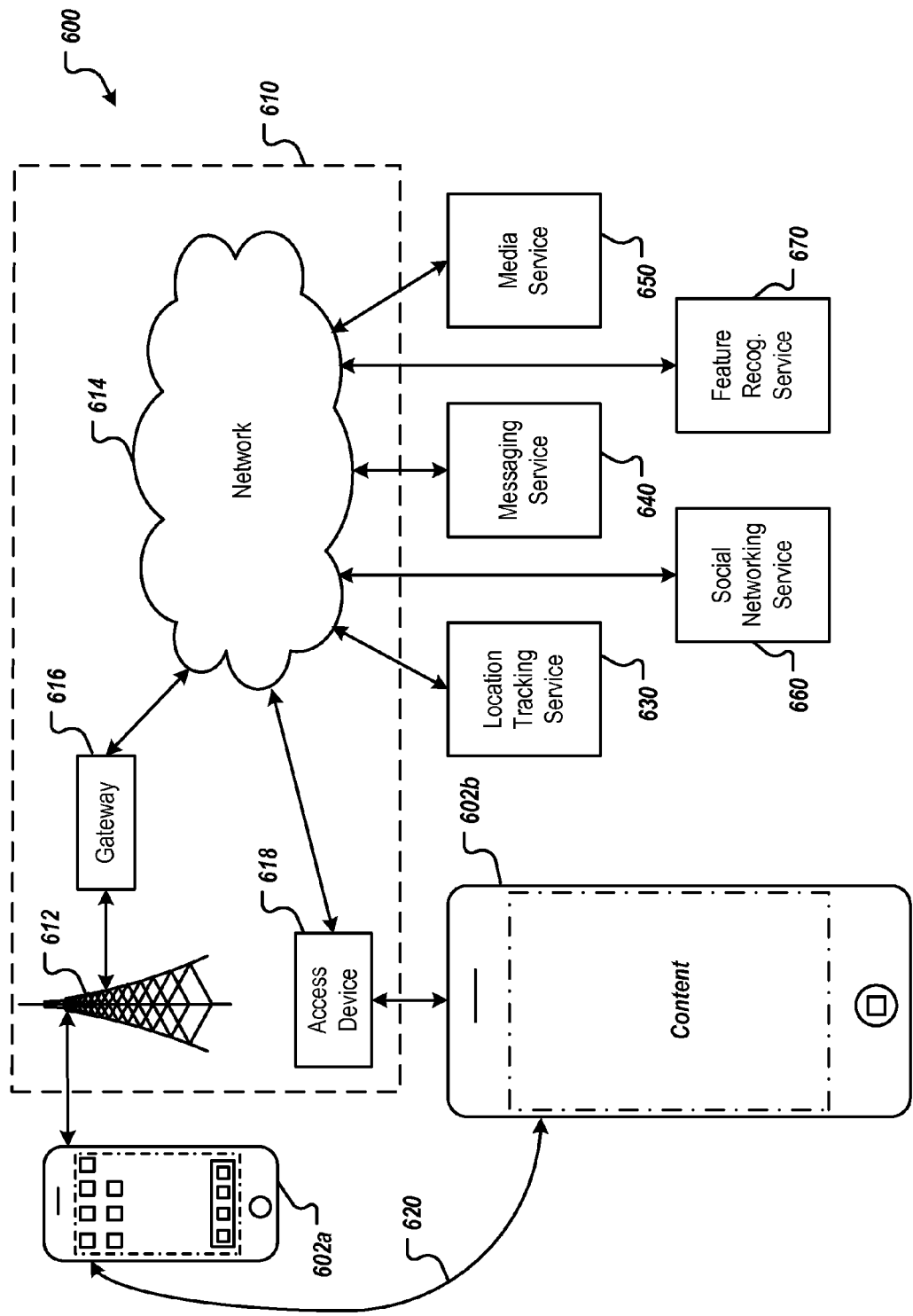
FIG. 6 is a block diagram illustrating an exemplary system architecture for implementing the features and operations described in reference to FIGS. 1-5.

FIG. 6 is a block diagram of an exemplary network operating environment for the mobile devices of 1-5. Mobile devices 602a and 602b can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over wireless network 612 and the access device 618. For example, mobile device 602a can place and receive phone calls (e.g., using VoIP protocols), send and receive e-mail messages (e.g., using POP3 protocol), and retrieve electronic documents and/or streams, such as web pages, photographs, and videos, over wireless network 612, gateway 616, and wide area network 614 (e.g., using TCP/IP or UDP protocols). Likewise, in some implementations, the mobile device 602b can place and receive phone calls, send and receive e-mail messages, and retrieve electronic documents over the access device 618 and the wide area network 614. In some implementations, mobile device 602a or 602b can be physically connected to the access device 618 using one or more cables and the access device 618 can be a personal computer. In this configuration, mobile device 602a or 602b can be referred to as a "tethered" device.

Mobile devices 602a and 602b can also establish communications by other means. For example, wireless device 602a can communicate with other wireless devices, e.g., other mobile devices 602a or 602b, cell phones, etc., over the wireless network 612. Likewise, mobile devices 602a and 602b can establish peer-to-peer communications 620, e.g., a personal area network, by use of one or more communication subsystems, such as the Bluetooth® communication devices 104, 106, and 108 as shown in FIG. 1. Other communication protocols and topologies can also be implemented.

The mobile device 602a or 602b can, for example, communicate with one or more services 630, 640, 650, 660, and 670 over the one or more wired and/or wireless networks. For example, one or more location tracking 630 can provide location information, e.g., venues that correspond to latitudes and longitudes, location polling services, route tracking service, and other service and information, to mobile device 602a or 602b.

Messaging service 640 can, for example, provide e-mail and/or other messaging services (e.g., SMS). Media service 650 can, for example, provide access to media files, such as song files, audio books, movie files, video clips, and other media data. In some implementations, separate audio and video services (not shown) can provide access to the respective types of media files. Media service 650 can also include function for analyzing a list of songs downloaded by the user, identifying the user's preference by extrapolating from the downloaded songs artist and genre information, and generating a playlist of songs based on the identified preference.

Social networking service 660 can, for example, perform ad hoc networking services based on content and location between mobile devices 602a and 602b as described in FIGS. 1-5 above. A user of mobile device 602b can invoke an ad hoc networking functionality, for example, by pressing a matching object on the top-level graphical user interface of the mobile device. Feature recognition service 670 can, for example, perform the processes described in reference to FIG. 4, including identifying faces and associating faces with users. Other services can also be provided, including a software update service that automatically determines whether software updates exist for software on mobile device 602a or 602b, then downloads the software updates to mobile device 602a or 602b where the software updates can be manually or automatically unpacked and/or installed.

Mobile device 602a or 602b can also access other data and content over the one or more wired and/or wireless networks. For example, content publishers, such as news sites, RSS feeds, web sites, blogs, social networking sites, developer networks, etc., can be accessed by mobile device 602a or 602b. Such access can be provided by invocation of a web browsing function or application (e.g., a browser) in response to a user touching, for example, a Web object.

Exemplary Mobile Device Architecture

Figure 7:
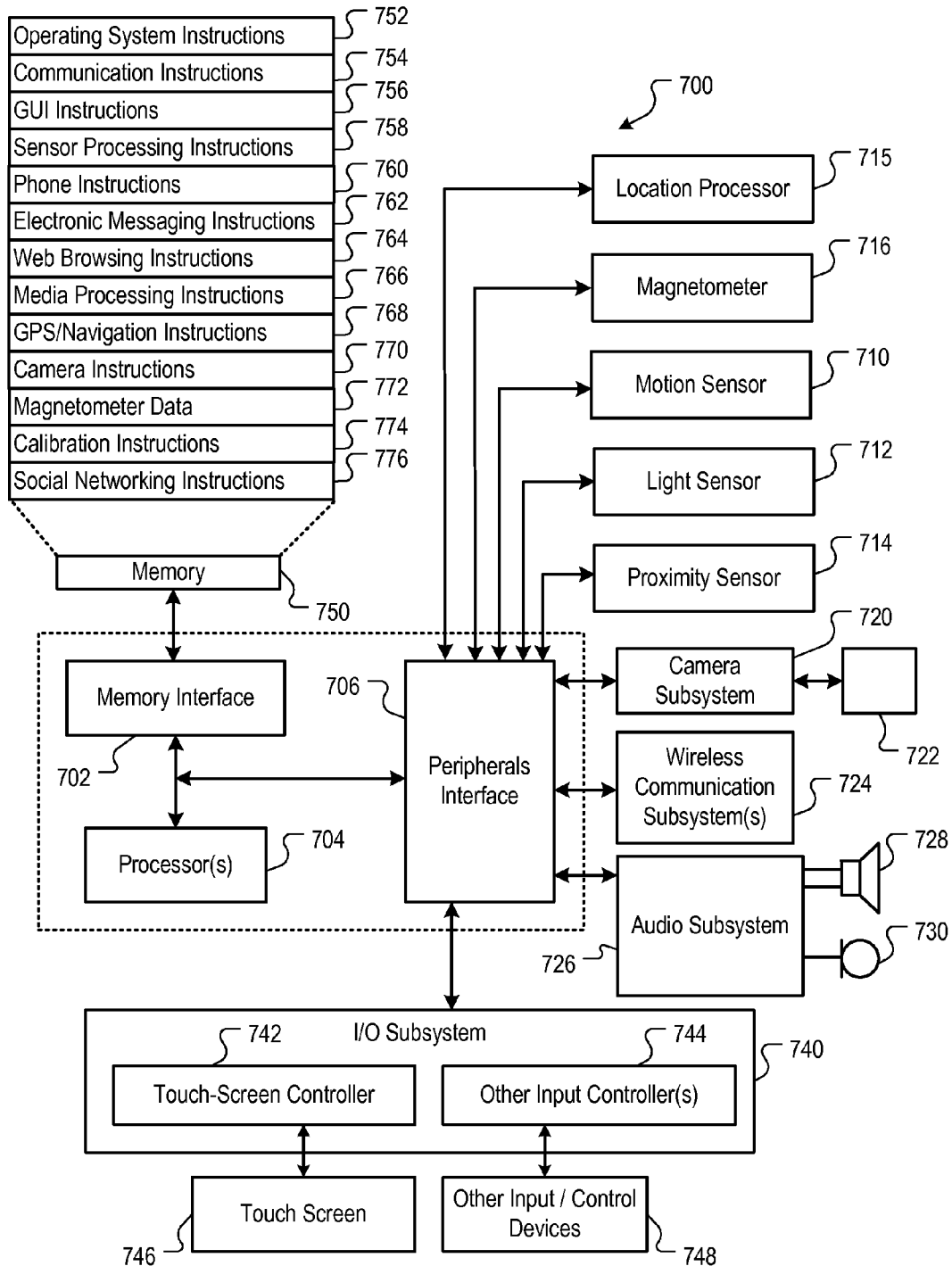
FIG. 7 is a block diagram illustrating an exemplary device architecture of a mobile device implementing the features and operations described in reference to FIGS. 1-6.

FIG. 7 is a block diagram of an exemplary architecture 700 for the mobile devices of FIGS. 1-6. A mobile device can include memory interface 702, one or more data processors, image processors and/or central processing units 704, and peripherals interface 706. Memory interface 702, one or more processors 704 and/or peripherals interface 706 can be separate components or can be integrated in one or more integrated circuits. The various components in mobile device 104, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass as described above in FIGS. 1-6.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi or WiMax network, and a Bluetooth® network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 400 on or off. The user may be able to customize a functionality of one or more of the buttons. The touch screen 746 can, for example, also be used to implement virtual or soft buttons and/or a keyboard.

In some implementations, mobile device 400 can present recorded audio and/or video files, such as MP3, AAC, and MPEG files. In some implementations, mobile device 400 can include the functionality of an MP3 player, such as an iPod™ Mobile device 400 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. In some implementations, social networking instructions 776 can be used to implement the features of ad hoc networking based on content and location as described in FIGS. 1-6.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method, comprising:
   receiving, from a first mobile device, a first request to participate in social networking;
   receiving, from a second mobile device, a second request to participate in the social networking;
   determining that the second mobile device is located within a social networking distance of the first mobile device, the social networking distance being a distance between two mobile devices each of which requested participation in the social networking;
   determining a match score between the first mobile device and the second mobile device based on usage data of the first mobile device and the second mobile device, comprising:
      determining similarity between a first content collection created for the first mobile device using content items in a first library and a second content collection created for the second mobile device using content items in a second library, the first and second content collections being parts of the usage data, the first and second content collections being generated using collaborative filtering; and
   sending a notification to at least one of the first mobile device and the second mobile device, the notification indicating that a social networking opportunity exists within the social networking distance.

2. The method of claim 1, where determining the match score includes:
   identifying common content items downloaded to both the first mobile device and the second mobile device according to the usage data; and
   calculating the match score based on a number of the downloaded common content items.

3. A computer implemented method comprising:
   receiving, from a first mobile device, a first request to participate in social networking;

receiving, from a second mobile device, a second request to participate in the social networking;
determining that the second mobile device is located within a social networking distance of the first mobile device;
determining a match score between the first mobile device and the second mobile device based on usage data of the first mobile device and the second mobile device, including:
recognizing that one or more first images uploaded from the first mobile device and one or more second images uploaded from the second mobile device relate to one or more common subjects using facial recognition; and
calculating the match score based on a number of the common subjects; and
sending a notification to at least one of the first mobile device and the second mobile device based on the match score, the notification indicating that a social networking opportunity exists within the social networking distance.

4. The method of claim 2, where the second request is received within a time window of receiving the first request.

5. A computer implemented method, comprising:
from a first mobile device, sending to a server a first request to participate in social networking;
sending to the server information specifying a geographical location of the first mobile device;
receiving notification from the server that a second mobile device is located within a social networking distance of the first mobile device, that the second mobile device has sent a second request to participate in the social networking, and that the first mobile device and the second mobile device share at least one common item in usage data of the first mobile device and the second mobile device, wherein the social networking distance is a distance between two mobile devices each of which requested participation in the social networking;
determining a match score between the first mobile device and the second mobile device based on usage data of the first mobile device and the second mobile device, comprising:
determining similarity between a first content collection created for the first mobile device using content items in a first library and a second content collection created for the second mobile device using content items in a second library, the first and second content collections being parts of the usage data, the first and second content collections being generated using collaborative filtering; and
displaying the notification on the first mobile device, including displaying the match score between the first mobile device and the second mobile device.

6. The method of claim 5, further comprising displaying on the first mobile device a direction toward where the second mobile device is located or a distance between the first mobile device and the second mobile device.

7. The method of claim 5, further comprising:
on the first mobile device, displaying a user interface in association with the first request, the user interface operable to receive user permission to transmit usage data; and
upon receiving the user permission, sending the usage data of the first mobile device to the server.

8. A computer implemented method, comprising:
on a first mobile device, receiving a user request to participate in social networking with mobile devices located within a social networking distance of the first mobile device, the social networking distance being a distance between two mobile devices each of which requested participation in the social networking;
identifying a second mobile device within the social networking distance of the first mobile device, the second mobile device configured to participate in the social networking;
transmitting usage data from the first mobile device to the second mobile device;
on the first mobile device, receiving from the second mobile device an identification of at least one match between the first mobile device and the second mobile device, the match being determined based on the usage data by determining similarity between a first content collection created for the first mobile device using content items in a first library and a second content collection created for the second mobile device using content items in a second library, the first and second content collections being parts of the usage data, the first and second content collections being generated using collaborative filtering; and
indicating on the first mobile device that a social networking opportunity exists within the social networking distance based on the match.

9. The method of claim 8, wherein the social networking distance is determined by a transmission range of the first mobile device.

10. The method of claim 8, wherein the usage data include a trajectory of the first mobile device, the trajectory identifying one or more geographical locations the first mobile device has visited.

11. The method of claim 10, wherein the match is determined based on collaborative filtering of the usage data, the collaborative filtering including identifying a geographical location that both the first and the second mobile device have visited in the past.

12. The method of claim 8, wherein the match is determined based on collaborative filtering of the usage data, the collaborative filtering including identifying a browsing preference between the first mobile device and the second mobile device, including at least one of common browsing history, common browsing bookmarks, and membership at common content provider websites.

13. The method of claim 8, wherein indicating on the first mobile device that a social networking opportunity exists includes displaying identification information of a user of the second mobile device and displaying a match score, the match score measuring a confidence level of the match.

14. The method of claim 8, wherein indicating on the first mobile device that a social networking opportunity exists includes displaying an indicator on the first mobile device, the indicator indicating a direction at which the second mobile device is located based on geographical coordinates of the first and second mobile devices.

15. The method of claim 14, wherein the first mobile device includes an electronic compass for indicating the direction.

16. A computer implemented method, comprising:
on a first mobile device, receiving a request to participate in social networking with mobile devices located within a social networking distance of the first mobile device, the social networking distance being a distance between two mobile devices each of which requested participation in the social networking;
detecting that at least one second mobile device is located within the social networking distance of the first mobile device, the second mobile device transmitting an invitation for social networking;

on the first mobile device, receiving usage data of the second mobile device;

identifying at least one match between the usage data of the second mobile device and usage data of the first mobile device, comprising:

determining similarity between a first content collection created for the first mobile device using content items in a first library and a second content collection created for the second mobile device using content items in a second library, the first and second content collections being parts of the usage data, the first and second content collections being generated using collaborative filtering; and accepting the invitation, including sending an indicator of the match to the second mobile device.

17. The method of claim 16, wherein the usage data on each of the first mobile device and the second mobile device include a recently played song list.

18. The method of claim 16, wherein the usage data on each of the first mobile device and the second mobile device include a music genre configured on the first mobile device.

19. The method of claim 16, wherein the usage data on each of the first mobile device and the second mobile device include a list of recently played electronic games.

20. The method of claim 16, wherein the usage data on each of the first mobile device and the second mobile device include a list of recently played electronic games.

21. The method of claim 16, wherein usage data on each of the first mobile device and the second mobile device includes a list of recently played electronic games.

22. The method of claim 16, wherein accepting the invitation from the second mobile device includes sending the match score to the second mobile device.

23. A system, comprising:
one or more computers configured to perform operations comprising:
receiving, from a first mobile device, a first request to participate in social networking;
receiving from a second mobile device a second request to participate in the social networking;
determining that the second mobile device is located within a social networking distance of the first mobile device, the social networking distance being a distance between two mobile devices each of which requested participation in the social networking;
determining a match score between the first mobile device and the second mobile device based on usage data of the first mobile device and the second mobile device, comprising:
determining similarity between a first content collection created for the first mobile device using content items in a first library and a second content collection created for the second mobile device using content items in a second library, the first and second content collections being parts of the usage data, the first and second content collections being generated using collaborative filtering; and
sending a notification to at least one of the first mobile device and the second mobile device, the notification indicating that a social networking opportunity exists within the social networking distance.

24. The system of claim 23, where determining the match score includes:
identifying common content items downloaded to both the first mobile device and the second mobile device according to the usage data; and
calculating the match score based on a number of the downloaded common content items.

25. A system, comprising:
one or more computers configured to perform operations comprising:
receiving, from a first mobile device, a first request to participate in social networking;
receiving from a second mobile device a second request to participate in the social networking;
determining that the second mobile device is located within a social networking distance of the first mobile device;
determining a match score between the first mobile device and the second mobile device based on usage data of the first mobile device and the second mobile device, including:
recognizing that one or more first images uploaded from the first mobile device and one or more second images uploaded from the second mobile device relate to one or more common subjects using facial recognition; and
calculating the match score based on a number of the common subjects; and
sending a notification to at least one of the first mobile device and the second mobile device based on the match score, the notification indicating that a social networking opportunity exists within the social networking distance.

26. The system of claim 25, where the second request is received within a time window of receiving the first request.

27. A system, comprising:
a first mobile device configured to perform operations comprising:
sending to a server a first request to participate in social networking;
sending to the server information specifying a geographical location of the first mobile device;
receiving notification from the server that a second mobile device is located within a social networking distance of the first mobile device, that the second mobile device has sent a second request to participate in the social networking, and that the first mobile device and the second mobile device share at least one common item in usage data of the first mobile device and the second mobile device, wherein the social networking distance is a distance between two mobile devices each of which requested participation in the social networking;
determining a match score between the first mobile device and the second mobile device based on usage data of the first mobile device and the second mobile device, comprising:
determining similarity between a first content collection created for the first mobile device using content items in a first library and a second content collection created for the second mobile device using content items in a second library, the first and second content collections being parts of the usage data, the first and second content collections being generated using collaborative filtering; and
displaying the notification on the first mobile device, including displaying the match score between the first mobile device and the second mobile device.

28. The system of claim 27, the operations further comprising displaying on the first mobile device a direction toward where the second mobile device is located or a distance between the first mobile device and the second mobile device.

29. The system of claim 27, the operations further comprising:
on the first mobile device, displaying a user interface in association with the first request, the user interface operable to receive user permission to transmit usage data; and
upon receiving the user permission, sending the usage data of the first mobile device to the server.

30. A system, comprising:
a first mobile device configured to perform operations comprising:
receiving a user request to participate in social networking with mobile devices located within a social networking distance of the first mobile device, the social networking distance being a distance between two mobile devices each of which requested participation in the social networking;
identifying a second mobile device within the social networking distance of the first mobile device, the second mobile device configured to participate in the social networking;
transmitting usage data from the first mobile device to the second mobile device;
on the first mobile device, receiving from the second mobile device an identification of at least one match between the first mobile device and the second mobile device, the match being determined based on the usage data by determining similarity between a first content collection created for the first mobile device using content items in a first library and a second content collection created for the second mobile device using content items in a second library, the first and second content collections being parts of the usage data, the first and second content collections being generated using collaborative filtering; and
indicating on the first mobile device that a social networking opportunity exists within the social networking distance based on the match.

31. The system of claim 30, wherein the social networking distance is determined by a transmission range of the first mobile device.

32. The system of claim 30, wherein the usage data include a trajectory of the first mobile device, the trajectory identifying one or more geographical locations the first mobile device has visited.

33. The system of claim 32, wherein the match is determined based on collaborative filtering the usage data, the collaborative filtering including identifying a geographical location that both the first and the second mobile device have visited in the past.

34. The system of claim 30, wherein the match is determined based on collaborative filtering the usage data, the collaborative filtering including identifying a browsing preference between the first mobile device and the second mobile device, including at least one of common browsing history, common browsing bookmarks, and membership at common content provider websites.

35. The system of claim 30, wherein indicating on the first mobile device that a social networking opportunity exists includes displaying an indicator on the first mobile device, the indicator indicating a direction at which the second mobile device is located based on geographical coordinates of the first and second mobile devices.

36. The system of claim 35, wherein the first mobile device includes an electronic compass for indicating the direction.

37. A system, comprising:
a first mobile device configured to perform operations comprising:
receiving a request to participate in social networking with mobile devices located within a social networking distance of the first mobile device, the social networking distance being a distance between two mobile devices each of which requested participation in the social networking;
detecting that at least one second mobile device is located within the social networking distance of the first mobile device, the second mobile device transmitting an invitation for social networking;
on the first mobile device, receiving usage data of the second mobile device;
identifying at least one match between the usage data of the second mobile device and usage data of the first mobile device, comprising:
determining similarity between a first content collection created for the first mobile device using content items in a first library and a second content collection created for the second mobile device using content items in a second library, the first and second content collections being parts of the usage data, the first and second content collections being generated using collaborative filtering; and
accepting the invitation, including sending an indicator of the match to the second mobile device.

38. The system of claim 37, wherein the usage data on each of the first mobile device and the second mobile device include a recently played song list.

39. The system of claim 37, wherein the usage data on each of the first mobile device and the second mobile device include a music genre configured on the first mobile device.

40. A non-transitory computer storage device storing a computer program product, the computer program product operable to cause data processing apparatus to perform operations comprising:
receiving, from a first mobile device, a first request to participate in social networking;
receiving from a second mobile device a second request to participate in the social networking;
determining that the second mobile device is located within a social networking distance of the first mobile device, the social networking distance being a distance between two mobile devices each of which requested participation in the social networking;
determining a match score between the first mobile device and the second mobile device based on usage data of the first mobile device and the second mobile device, comprising:
determining similarity between a first content list created for the first mobile device using content items in a first library and a second content list created for the second mobile device using content items in a second library, the first and second content lists being parts of the usage data, the first and second content lists generated using collaborative filtering; and
sending a notification to at least one of the first mobile device and the second mobile device, the notification indicating that a social networking opportunity exists within the social networking distance.

41. The device of claim 40, where determining the match score includes:

identifying common content items downloaded to both the first mobile device and the second mobile device according to the usage data; and calculating the match score based on a number of the downloaded common content items.

42. A computer program product stored on a computer storage device, operable to cause data processing apparatus to perform operations comprising:

receiving, from a first mobile device, a first request to participate in social networking;

receiving, from a second mobile device, a second request to participate in the social networking;

determining that the second mobile device is located within a social networking distance of the first mobile device;

determining a match score between the first mobile device and the second mobile device based on usage data of the first mobile device and the second mobile device, including:

recognizing that one or more first documents uploaded from the first mobile device and one or more second documents uploaded from the second mobile device relate to one or more common subjects using facial recognition; and calculating the match score based on a number of the common subjects; and sending a notification to at least one of the first mobile device and the second mobile device based on the match score, the notification indicating that a social networking opportunity exists within the social networking distance.

43. The computer program product of claim 42, where the second request is received within a time window of receiving the first request.

44. A non-transitory computer storage device storing a computer program product, the computer program product operable to cause a first mobile device to perform operations comprising:

sending to a server a first request to participate in social networking;

sending to the server information specifying a geographical location of the first mobile device;

receiving notification from the server that a second mobile device is located within a social networking distance of the first mobile device, that the second mobile device has sent a second request to participate in the social networking, and that the first mobile device and the second mobile device share at least one common item in usage data of the first mobile device and the second mobile device, wherein the social networking distance is a distance between two mobile devices each of which requested participation in the social networking;

determining a match score between the first mobile device and the second mobile device based on usage data of the first mobile device and the second mobile device, comprising:

determining similarity between a first content collection created for the first mobile device using content items in a first library and a second content collection created for the second mobile device using content items in a second library, the first and second content collections being parts of the usage data, the first and second content collections being generated using collaborative filtering; and displaying the notification on the first mobile device, including displaying the match score between the first mobile device and the second mobile device.

45. The device of claim 44, the operations further comprising displaying on the first mobile device a direction toward where the second mobile device is located or a distance between the first mobile device and the second mobile device.

46. The device of claim 44, the operations further comprising:

on the first mobile device, displaying a user interface in association with the first request, the user interface operable to receive user permission to transmit usage data; and upon receiving the user permission, sending the usage data of the first mobile device to the server.

47. A non-transitory computer storage device storing a program product, the program product operable to cause a first mobile device to perform operations comprising:

receiving a user request to participate in social networking with mobile devices located within a social networking distance of the first mobile device, the social networking distance being a distance between two mobile devices each of which requested participation in the social networking;

identifying a second mobile device within the social networking distance of the first mobile device, the second mobile device configured to participate in the social networking;

transmitting usage data from the first mobile device to the second mobile device;

on the first mobile device, receiving from the second mobile device an identification of at least one match between the first mobile device and the second mobile device, the match being determined based on the usage data; and indicating on the first mobile device that a social networking opportunity exists within the social networking distance based on the match.

48. The device of claim 47, wherein the social networking distance is determined by a transmission range of the first mobile device.

49. The device of claim 47, wherein the usage data include a trajectory of the first mobile device, the trajectory identifying one or more geographical locations the first mobile device has visited.

50. The device of claim 49, wherein the match is determined based on collaborative filtering of the usage data, the collaborative filtering including identifying a geographical location that both the first and the second mobile device have visited in the past.

51. The device of claim 47, wherein the match is determined based on collaborative filtering of the usage data, the collaborative filtering including identifying a browsing preference between the first mobile device and the second mobile device, including at least one of common browsing history, common browsing bookmarks, and membership at common content provider websites.

52. The device of claim 47, wherein indicating on the first mobile device that a social networking opportunity exists includes displaying an indicator on the first mobile device, the indicator indicating a direction at which the second mobile device is located based on geographical coordinates of the first and second mobile devices.

53. The device of claim 52, wherein the first mobile device includes an electronic compass for indicating the direction.

54. A non-transitory computer storage device storing a computer program product, the computer product operable to cause a first mobile device to perform operations comprising:

receiving a request to participate in social networking with mobile devices located within a social networking distance of the first mobile device, the social networking distance being a distance between two mobile devices each of which requested participation in the social networking;

detecting that at least one second mobile device is located within the social networking distance of the first mobile device, the second mobile device transmitting an invitation for social networking;

on the first mobile device, receiving usage data of the second mobile device;

identifying at least one match between the usage data of the second mobile device and usage data of the first mobile device, comprising:

determining similarity between a first content collection created for the first mobile device using content items in a first library and a second content collection created for the second mobile device using content items in a second library, the first and second content collections being parts of the usage data, the first and second content collections being generated using collaborative filtering; and accepting the invitation, including sending an indicator of the match to the second mobile device.

55. The device of claim 54, wherein the usage data on each of the first mobile device and the second mobile device include a recently played song list.

56. The device of claim 54, wherein the usage data on each of the first mobile device and the second mobile device include a music genre configured on the first mobile device.

57. A computer implemented method, comprising:

receiving, from a first mobile device, a first request to participate in social networking;

receiving, from a second mobile device, a second request to participate in the social networking;

determining that the second mobile device is located within a social networking distance of the first mobile device;

determining a match score between the first mobile device and the second mobile device based on usage data of the first mobile device and the second mobile device, wherein determining the match score comprises applying collaborative filtering to first content items from usage data of the first mobile device and second content items from usage data of the second mobile device; and sending a notification to at least one of the first mobile device and the second mobile device, the notification indicating that a social networking opportunity exists within the social networking distance.

58. The method of claim 57, wherein applying collaborative filtering comprises filtering information or patterns based on collaboration among multiple users.

59. A system, comprising:

one or more computers configured to perform operations comprising:

receiving, from a first mobile device, a first request to participate in social networking;

receiving, from a second mobile device, a second request to participate in the social networking;

determining that the second mobile device is located within a social networking distance of the first mobile device;

determining a match score between the first mobile device and the second mobile device based on usage data of the first mobile device and the second mobile device, wherein determining the match score comprises applying collaborative filtering to first content items from usage data of the first mobile device and second content items from usage data of the second mobile device; and sending a notification to at least one of the first mobile device and the second mobile device, the notification indicating that a social networking opportunity exists within the social networking distance.

60. The system of 59, wherein applying collaborative filtering comprises filtering information or patterns based on collaboration among multiple users.

61. A non-transitory storage device storing a computer program product, the computer program product operable to cause data processing apparatus to perform operations comprising:

receiving, from a first mobile device, a first request to participate in social networking;

receiving, from a second mobile device, a second request to participate in the social networking;

determining that the second mobile device is located within a social networking distance of the first mobile device;

determining a match score between the first mobile device and the second mobile device based on usage data of the first mobile device and the second mobile device, wherein determining the match score comprises applying collaborative filtering to first content items from usage data of the first mobile device and second content items from usage data of the second mobile device; and sending a notification to at least one of the first mobile device and the second mobile device, the notification indicating that a social networking opportunity exists within the social networking distance.

62. The device of claim 61, wherein applying collaborative filtering comprises filtering information or patterns based on collaboration among multiple users.

* * * * *